(12) United States Patent
Koenders

(10) Patent No.: US 12,353,703 B2
(45) Date of Patent: Jul. 8, 2025

(54) COMPUTING DEVICE HAVING USER-INPUT ACCESSORY

(71) Applicant: Microsoft Technology Licensing, LLC, Redmond, WA (US)

(72) Inventor: Oscar Koenders, Sammamish, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 720 days.

(21) Appl. No.: 14/925,272

(22) Filed: Oct. 28, 2015

(65) Prior Publication Data

US 2017/0123622 A1    May 4, 2017

(51) Int. Cl.
  *G06F 3/0488*    (2022.01)
  *G06F 3/041*    (2006.01)
  (Continued)

(52) U.S. Cl.
  CPC .......... *G06F 3/0488* (2013.01); *G06F 3/0416* (2013.01); *G06F 9/445* (2013.01); *G06F 9/451* (2018.02); *H04W 8/005* (2013.01)

(58) Field of Classification Search
  CPC .................. G06F 3/0414; G06F 3/0416; G06F 3/048–04897; H04W 8/005
  See application file for complete search history.

(56) References Cited

U.S. PATENT DOCUMENTS 5,060,135 A     10/1991  Levine et al.
5,155,813 A *   10/1992  Donoghue .......... G06F 3/04845
                                    345/179

(Continued)

FOREIGN PATENT DOCUMENTS

CN    103188397 A    7/2013
CN    104035675 A    9/2014
(Continued)

OTHER PUBLICATIONS

Rekimoto, U. (2001). "DataTiles: A Modular Platform for Mixed Physical and Graphical Interactions." Proceedings of the SIGCHI Conference on Human Factors in Computing Systems, 269-276. https://doi.org/10.1145/365024.365115 (Year: 2001).*

(Continued)

*Primary Examiner* — Matthew Ell
*Assistant Examiner* — Alvaro R Calderon, IV
(74) *Attorney, Agent, or Firm* — ArentFox Schiff LLP

(57) ABSTRACT

An application can be launched and operated in conjunction with a user-interface accessory (UIA). A launching engine can, using a wireless interrogator, detect an identifier of the UIA. The launching engine can determine and execute a software application corresponding to the UIA identifier. An interaction engine can, using the wireless interrogator, detect an identifier of an object. The interaction engine can detect a force exerted against a sensing surface of a force sensor by the object. The interaction engine can provide to the software application information of the second identifier and the detected force. Some examples include presenting a user interface based on the identifier of the UIA, determining a representation of the object using the identifier of the object, and presenting the representation arranged based on spatial data of the object. Some examples include presenting a user interface specific to the identifier of the UIA.

10 Claims, 8 Drawing Sheets

(51) Int. Cl.
  *G06F 9/445*  (2018.01)
  *G06F 9/451*  (2018.01)
  *H04W 8/00*  (2009.01)

(56) References Cited

U.S. PATENT DOCUMENTS

| | | | |
|---|---|---|---|
| 5,347,620 A * | 9/1994 | Zimmer | G06F 3/04845 |
| | | | 101/492 |
| 5,488,204 A | 1/1996 | Mead et al. | |
| 5,732,227 A | 3/1998 | Kuzunuki et al. | |
| 5,813,009 A | 9/1998 | Johnson et al. | |
| 5,835,096 A * | 11/1998 | Baldwin | G06F 3/14 |
| | | | 345/582 |
| 5,969,720 A | 10/1999 | Lisle et al. | |
| 6,005,547 A | 12/1999 | Newman et al. | |
| 6,175,954 B1 * | 1/2001 | Nelson | G06F 8/34 |
| | | | 717/105 |
| 6,243,724 B1 | 6/2001 | Mander et al. | |
| 6,340,978 B1 | 1/2002 | Mindrum | |
| 6,353,850 B1 * | 3/2002 | Wies | G05B 19/00 |
| | | | 709/203 |
| 6,375,344 B1 | 4/2002 | Hanson et al. | |
| 6,408,278 B1 | 6/2002 | Carney et al. | |
| 6,433,775 B1 * | 8/2002 | Gould | G06F 3/04812 |
| | | | 345/157 |
| 6,545,660 B1 | 4/2003 | Shen et al. | |
| 6,572,015 B1 | 6/2003 | Norton | |
| 6,597,255 B1 | 7/2003 | Turton | |
| 6,710,754 B2 | 3/2004 | Hanson et al. | |
| 6,725,427 B2 | 4/2004 | Freeman et al. | |
| 6,760,884 B1 | 7/2004 | Vertelney et al. | |
| 6,874,037 B1 | 3/2005 | Abram et al. | |
| 6,886,047 B2 | 4/2005 | Leong et al. | |
| 6,894,703 B2 | 5/2005 | Vernier et al. | |
| 7,134,756 B2 | 11/2006 | Drucker et al. | |
| 7,254,665 B2 | 8/2007 | Yee | |
| 7,327,376 B2 | 2/2008 | Shen et al. | |
| 7,358,962 B2 | 4/2008 | Dehlin et al. | |
| 7,376,901 B2 | 5/2008 | Shen et al. | |
| 7,378,966 B2 * | 5/2008 | Agarwal | G06K 7/0008 |
| | | | 340/10.1 |
| 7,379,047 B2 | 5/2008 | Drucker et al. | |
| 7,394,459 B2 | 7/2008 | Bathiche et al. | |
| 7,397,464 B1 * | 7/2008 | Robbins | G06F 3/0425 |
| | | | 345/156 |
| 7,466,308 B2 | 12/2008 | Dehlin | |
| 7,467,380 B2 | 12/2008 | Kurlander et al. | |
| 7,511,703 B2 | 3/2009 | Wilson et al. | |
| 7,525,538 B2 | 4/2009 | Bathiche | |
| 7,613,842 B2 * | 11/2009 | Kong | G06F 3/0238 |
| | | | 345/172 |
| 7,627,831 B2 | 12/2009 | Chiu et al. | |
| 7,639,231 B2 | 12/2009 | Parry et al. | |
| 7,657,846 B2 | 2/2010 | Banks et al. | |
| 7,686,682 B2 | 3/2010 | Diakopoulos et al. | |
| 7,743,348 B2 | 6/2010 | Robbins et al. | |
| 7,898,505 B2 | 3/2011 | Blythe et al. | |
| 7,970,870 B2 | 6/2011 | Hinckley et al. | |
| 8,159,350 B2 | 4/2012 | Bauchot et al. | |
| 8,199,117 B2 | 6/2012 | Izadi et al. | |
| 8,209,628 B1 * | 6/2012 | Davidson | G06F 3/0487 |
| | | | 715/790 |
| 8,519,952 B2 | 8/2013 | Yee | |
| 8,543,455 B2 | 9/2013 | Damera-Venkata et al. | |
| 8,731,614 B2 | 5/2014 | Kim et al. | |
| 8,827,792 B2 | 9/2014 | Sylla et al. | |
| 8,847,739 B2 * | 9/2014 | Wilson | G06F 3/046 |
| | | | 340/10.1 |
| 8,899,474 B2 | 12/2014 | Ackley et al. | |
| 8,923,760 B2 | 12/2014 | Iwasaki | |
| 8,930,834 B2 | 1/2015 | Sunday et al. | |
| 8,979,654 B2 | 3/2015 | Baerlocher et al. | |
| 9,001,082 B1 | 4/2015 | Rosenberg et al. | |
| 9,058,528 B2 * | 6/2015 | Agarwal | G06K 7/0008 |
| 9,129,473 B2 | 9/2015 | Nguyen et al. | |
| 9,134,798 B2 | 9/2015 | Morris et al. | |
| 9,176,749 B2 | 11/2015 | Kim et al. | |
| 9,201,624 B2 | 12/2015 | Joo et al. | |
| 10,585,498 B2 * | 3/2020 | Lee | G06F 3/046 |
| 2001/0006855 A1 | 7/2001 | Koitsalu | |
| 2001/0011026 A1 | 8/2001 | Nishijima | |
| 2002/0050988 A1 * | 5/2002 | Petrov | G06K 9/20 |
| | | | 345/418 |
| 2002/0087588 A1 | 7/2002 | McBride et al. | |
| 2002/0101418 A1 | 8/2002 | Vernier et al. | |
| 2002/0163537 A1 | 11/2002 | Vernier et al. | |
| 2002/0197587 A1 * | 12/2002 | Wood | G09B 5/06 |
| | | | 434/159 |
| 2003/0069874 A1 | 4/2003 | Hertzog et al. | |
| 2003/0098845 A1 | 5/2003 | Hanson et al. | |
| 2003/0137494 A1 * | 7/2003 | Tulbert | G06F 3/0423 |
| | | | 345/173 |
| 2003/0147386 A1 | 8/2003 | Zhang et al. | |
| 2004/0046784 A1 | 3/2004 | Shen et al. | |
| 2004/0098721 A1 | 5/2004 | Alverson et al. | |
| 2004/0150627 A1 | 8/2004 | Luman et al. | |
| 2004/0192274 A1 | 9/2004 | Vuori | |
| 2004/0252075 A1 | 12/2004 | Matsubara | |
| 2004/0267873 A1 | 12/2004 | Shen et al. | |
| 2005/0052176 A1 | 3/2005 | Liebenow | |
| 2005/0108485 A1 | 5/2005 | Perego | |
| 2005/0116683 A1 | 6/2005 | Cheng et al. | |
| 2005/0120381 A1 | 6/2005 | Yamaguchi | |
| 2005/0122308 A1 | 6/2005 | Bell et al. | |
| 2005/0147218 A1 | 7/2005 | Novack et al. | |
| 2005/0181839 A1 | 8/2005 | Tiainen et al. | |
| 2005/0182857 A1 * | 8/2005 | Kong | G06F 3/0238 |
| | | | 710/1 |
| 2005/0183035 A1 | 8/2005 | Ringel et al. | |
| 2005/0219204 A1 | 10/2005 | Huddleston et al. | |
| 2005/0248729 A1 | 11/2005 | Drucker et al. | |
| 2005/0251800 A1 * | 11/2005 | Kurlander | G06F 3/038 |
| | | | 717/174 |
| 2005/0270170 A1 * | 12/2005 | Krumm | G06K 7/0008 |
| | | | 340/8.1 |
| 2006/0001645 A1 * | 1/2006 | Drucker | G06F 3/017 |
| | | | 345/156 |
| 2006/0039030 A1 | 2/2006 | Peterschmidt | |
| 2006/0068870 A1 | 3/2006 | Crawford, III et al. | |
| 2006/0090078 A1 * | 4/2006 | Blythe | G06F 1/1605 |
| | | | 713/185 |
| 2006/0119541 A1 | 6/2006 | Blythe et al. | |
| 2006/0125799 A1 | 6/2006 | Hillis et al. | |
| 2006/0146054 A1 * | 7/2006 | Matskewich | G06T 3/4023 |
| | | | 345/472 |
| 2006/0152750 A1 * | 7/2006 | Ohta | H04N 1/3871 |
| | | | 358/1.13 |
| 2006/0205381 A1 | 9/2006 | Beart et al. | |
| 2006/0230192 A1 | 10/2006 | Parry et al. | |
| 2006/0235546 A1 * | 10/2006 | Shivji | A63F 3/00643 |
| | | | 700/1 |
| 2006/0267952 A1 | 11/2006 | Alcorn | |
| 2006/0274046 A1 | 12/2006 | Hillis et al. | |
| 2006/0294247 A1 * | 12/2006 | Hinckley | G06F 3/038 |
| | | | 709/228 |
| 2007/0024463 A1 | 2/2007 | Hall et al. | |
| 2007/0030254 A1 | 2/2007 | Robrecht et al. | |
| 2007/0052540 A1 | 3/2007 | Hall et al. | |
| 2007/0067325 A1 * | 3/2007 | Weitzner | G06F 9/445 |
| 2007/0159304 A1 * | 7/2007 | Agarwal | G06K 7/0008 |
| | | | 340/10.32 |
| 2007/0213994 A1 * | 9/2007 | Agarwal | G06Q 10/00 |
| | | | 340/572.1 |
| 2007/0300307 A1 * | 12/2007 | Duncan | G06F 21/31 |
| | | | 726/27 |
| 2008/0021586 A1 * | 1/2008 | Schillen | B29C 64/129 |
| | | | 700/120 |
| 2008/0199837 A1 * | 8/2008 | Kuester | G09B 19/00 |
| | | | 434/129 |
| 2008/0207128 A1 * | 8/2008 | Mikko | G06F 9/445 |
| | | | 455/41.2 |
| 2008/0216125 A1 | 9/2008 | Li et al. | |

(56) References Cited

U.S. PATENT DOCUMENTS

| | | |
|---|---|---|
| 2008/0227539 A1 | 9/2008 | Sato |
| 2008/0235747 A1 | 9/2008 | Choi |
| 2008/0262916 A1 | 10/2008 | Damera-Venkata et al. |
| 2008/0281851 A1* | 11/2008 | Izadi ................. G06F 17/30056 |
| 2009/0063678 A1* | 3/2009 | Maegawa ............. G06Q 10/06 709/224 |
| 2009/0075724 A1 | 3/2009 | Breeding et al. |
| 2009/0095804 A1 | 4/2009 | Agevik et al. |
| 2009/0109030 A1* | 4/2009 | Do .......................... G06F 3/038 340/572.1 |
| 2009/0134973 A1 | 5/2009 | Sandler et al. |
| 2009/0195513 A1 | 8/2009 | Dybalski et al. |
| 2009/0231109 A1* | 9/2009 | Reichert ............. G06K 7/0008 340/10.41 |
| 2009/0251285 A1* | 10/2009 | Do .......................... G06F 21/10 340/5.74 |
| 2009/0273560 A1* | 11/2009 | Kalanithi ................ G06F 3/017 345/156 |
| 2009/0315678 A1* | 12/2009 | Padmanabhan .......... H04Q 9/00 340/10.1 |
| 2010/0026470 A1* | 2/2010 | Wilson .................... G06F 3/046 340/10.52 |
| 2010/0026635 A1* | 2/2010 | Dimitrov ............. G06F 3/0219 345/173 |
| 2010/0041332 A1 | 2/2010 | Flygh et al. |
| 2010/0069158 A1 | 3/2010 | Kim |
| 2010/0079369 A1* | 4/2010 | Hartmann ............. G06F 3/0416 345/156 |
| 2010/0259375 A1* | 10/2010 | Ferren .................... B60K 35/00 340/462 |
| 2011/0001686 A1 | 1/2011 | Belvin et al. |
| 2011/0019162 A1* | 1/2011 | Huebner ............. G03B 21/145 353/79 |
| 2011/0115818 A1 | 5/2011 | Chung et al. |
| 2011/0124401 A1 | 5/2011 | Durham et al. |
| 2011/0234502 A1* | 9/2011 | Yun .................... G06F 3/04886 345/173 |
| 2011/0249048 A1* | 10/2011 | Gullentops ............. B41C 1/003 347/5 |
| 2011/0249298 A1* | 10/2011 | Gullentops ............. B41C 1/003 358/1.18 |
| 2011/0252320 A1 | 10/2011 | Arrasvuori et al. |
| 2011/0272884 A1* | 11/2011 | Kraegeloh ........... A63H 18/002 273/237 |
| 2011/0273368 A1 | 11/2011 | Hinckley et al. |
| 2011/0281652 A1* | 11/2011 | Laverdiere ............. G11B 27/00 463/37 |
| 2011/0303741 A1 | 12/2011 | Bolton et al. |
| 2012/0049453 A1* | 3/2012 | Morichau-Beauchant .................. A63F 9/24 273/236 |
| 2012/0081207 A1 | 4/2012 | Toprani et al. |
| 2012/0095749 A1 | 4/2012 | Capretta |
| 2012/0154265 A1 | 6/2012 | Kim et al. |
| 2012/0206391 A1 | 8/2012 | Kim et al. |
| 2012/0258802 A1* | 10/2012 | Weston .................... A63F 13/95 463/37 |
| 2012/0262407 A1* | 10/2012 | Hinckley ................. G06F 3/038 345/173 |
| 2012/0324399 A1* | 12/2012 | Katsumata ......... H04N 1/00474 715/810 |
| 2013/0059089 A1* | 3/2013 | Gullentops ............. B41C 1/003 427/510 |
| 2013/0260852 A1* | 10/2013 | Baerlocher ............ G07F 17/322 463/11 |
| 2013/0308243 A1* | 11/2013 | Smoot .................... H01H 47/00 361/143 |
| 2014/0002417 A1* | 1/2014 | Yoshida ................ A63F 13/213 345/174 |
| 2014/0104191 A1* | 4/2014 | Davidson ................ G06F 3/041 345/173 |
| 2014/0104192 A1* | 4/2014 | Davidson ................ G06F 3/044 345/173 |
| 2014/0104193 A1* | 4/2014 | Davidson .............. G06F 3/0418 345/173 |
| 2014/0104194 A1* | 4/2014 | Davidson .............. G06F 3/0488 345/173 |
| 2014/0104225 A1* | 4/2014 | Davidson ................ G06F 3/042 345/174 |
| 2014/0104320 A1* | 4/2014 | Davidson ................ G09G 5/32 345/681 |
| 2014/0108979 A1* | 4/2014 | Davidson .............. G06F 3/0481 715/765 |
| 2014/0123038 A1 | 5/2014 | Ahn et al. |
| 2014/0139448 A1* | 5/2014 | Levesque ............. G06F 3/041 345/173 |
| 2014/0156054 A1* | 6/2014 | Goldman ............... D05B 19/08 700/138 |
| 2014/0280934 A1* | 9/2014 | Reagan .................... H04L 47/70 709/225 |
| 2014/0295814 A1* | 10/2014 | Heo ...................... H04W 4/005 455/418 |
| 2014/0317303 A1* | 10/2014 | Toprani ............... H04L 65/1003 709/227 |
| 2014/0325530 A1* | 10/2014 | Lu ........................... G06F 9/542 719/318 |
| 2014/0344420 A1* | 11/2014 | Rjeili ..................... H04L 43/04 709/220 |
| 2015/0068387 A1* | 3/2015 | Shi ....................... G09B 15/023 84/471 R |
| 2015/0091820 A1* | 4/2015 | Rosenberg ............ G06F 3/041 345/173 |
| 2015/0095883 A1* | 4/2015 | Shi ....................... G06F 11/362 717/109 |
| 2015/0134572 A1* | 5/2015 | Forlines .................. G06F 3/041 706/11 |
| 2015/0169212 A1* | 6/2015 | Chang .................. G06F 3/04883 715/780 |
| 2015/0220300 A1 | 8/2015 | Reynaga et al. |
| 2015/0242018 A1* | 8/2015 | Shi ....................... G09B 17/006 345/174 |
| 2015/0301678 A1* | 10/2015 | Park ....................... G06F 3/0416 345/173 |
| 2015/0378491 A1* | 12/2015 | Worfolk ................. G06F 3/0414 345/174 |
| 2015/0378492 A1* | 12/2015 | Rosenberg .............. G06F 3/042 345/174 |
| 2016/0001180 A1* | 1/2016 | Shi ....................... G06F 3/04162 463/32 |
| 2016/0084781 A1* | 3/2016 | Lee ........................ G06F 3/038 324/655 |
| 2016/0162036 A1* | 6/2016 | Shi ....................... G06F 3/04883 345/174 |
| 2016/0180734 A1* | 6/2016 | Shi ........................... A63F 13/77 434/169 |
| 2016/0182702 A1* | 6/2016 | Abehassera ......... H04M 1/7253 455/566 |
| 2016/0232878 A1 | 8/2016 | Chen et al. |
| 2016/0375354 A1* | 12/2016 | Francis ................. A63H 30/04 463/16 |
| 2016/0381171 A1* | 12/2016 | Anderson .............. H04L 67/22 709/217 |
| 2017/0024028 A1* | 1/2017 | Valentine ............. G06F 3/0416 |
| 2018/0107378 A1* | 4/2018 | Rosenberg .............. G06F 3/016 |

FOREIGN PATENT DOCUMENTS

| | | |
|---|---|---|
| CN | 104750406 A | 7/2015 |
| GB | 2394843 | 5/2004 |
| WO | 2005024865 | 3/2005 |
| WO | WO2006/111782 | 10/2006 |
| WO | 2014137054 A1 | 9/2014 |

(56) References Cited

OTHER PUBLICATIONS

Abowd, et al., "The Family Video Archive: An Annotation and Browsing Environment for Home Movies", available at east as early as Mar. 12, 2007, at <<http://delivery.acm.org/10.1145/980000/973266/p1-abowd.pdf?key1=973266&key2=9710583711&coll=&dl=acm&CFID=15151515&CFTOKEN=6184618>>, ACM, 2003, pp. 1-8.

Apple, Inc. "About External Accessories", published on Jun. 14, 2015, retrieved on Aug. 19, 2015, available at <<https://developer.apple.com/library/ios/featuredarticles/ExternalAccessoryPT/Introduction/Introduction.html>>, 2 pages.

Apted, et al., "Sharing Digital Media on Collaborative Tables and Displays", Technical Report 602, School of IT, The University of Sydney, Nov. 2006, 10 pages.

Beagrie, "Plenty of Room at the Bottom? Personal Digital Libraries and Collections", retrieved on Mar. 14, 2007, at <<http://www.dlib.org/dlib/june05/beagrie/06beagrie.html>>, Neil Beagrie, vol. 11, No. 6, 2005, pp. 1-9.

Buxton, "Multi-Touch Systems That I Have Known and Loved", available available at least as early as Feb. 9, 2007, at <<http://www.billbuxton.com/multitouchOverview.html>>, 2007, pp. 1-21.

"DiamondTouch", retrieved on Mar. 9, 2007, at <<http://www.merl.com/projects/DiamondTouch>>, Mitsubishi Research Laboratories, 2006, pp. 1-2.

"Ecoupled Technology Executive Summary", Version 1.2, available as early as May 2007, pp. 1-6.

Everitt, "UbiTable: Impromptu Face-to-Face Collaboration on Horizontal Interactive Surfaces", Mitsubishi Electric Research Laboratories Inc., TR2003-49 Sep. 2003, In the Proceedings of the Fifth International Conference on Ubiquitous Computing, 2003, pp. 281-288, 11 pages.

Gokturk, et al., "A Time-Of-Flight Sensor-System Description, Issues and Solutions", Proceedings of the 2004 Conference on Computer Vision and Pattern Recognition Workshop, 2004, pp. 1-9.

Ishii, et al., "ClearBoard: A Seamless Medium for Shared Drawing and Conversation with Eye Contact", ACM, 1992, pp. 1-10.

Izadi et al., "Dynamo: A public interactive surface supporting the cooperative sharing and exchange of media", Proceedings of the 16th annual ACM symposium on User interactive software and technology, 2003, pp. 159-168.

Koike, et al., "Information Layout and Interaction on Virtual and Real Rotary Tables", In the Proceedings of the Second Annual IEEE International Workshop on Horizontal Interactive Human-Computer Systems, 2007, pp. 95-102.

Leigh, et al., "DiamondTouch Characteristics and Capabilities", pp. 1-2, .In: UbiComp 2002 Workshop on Collaboration with Interactive Tables and Walls, Goteborg, Sweden (2002) , retrieved at <<http://www.ipsi.fraunhofer.de/ambiente/collabtablewallws/papers/leigh,%20merl,%20dt.pdf>>, 2 pages.

Loveridge, Sam, "Skylanders Trap Team vs Disney Infinity 2.0," retrieved Aug. 26, 2015 at <<http://www.trustedreviews.com/opinions/skylanders-trap-team-vs-disney-infinity-2-0>> 18 pages.

Mazalek, "Sharing and Browsing Media on a Digital Tabletop", available at least as early as Mar. 12, 2007, at <<http://alumni.media.mit.edu/~matt/cv/lviews_carpe_03.pdf>>, pp. 1-11.

Newman, et al., "CamWorks: A Video-Based Tool for Efficient Capture from Paper Source Documents", Proceedings of the IEEE International Conference on Multimedia Computing Systems, vol. 2, p. 647, 1999, pp. 1-7.

Niclass, et al., "A CMOS 3D Camera with Millimetric Depth Resolution", IEEE Custom Integrated Circuits Conference, p. 705-708, Oct. 2004, pp. 1-4.

Office action for U.S. Appl. No. 13/493,497, mailed on Oct. 3, 2013, Izadi, et al., "Interacting With Physical and Digital Objects Via a Multi-Touch Device", 23 pages.

Office Action for U.S. Appl. No. 13/493,497, mailed on Oct. 1, 2014, Shahram Izadi, "Interacting With Physical and Digital Objects Via a Multi-Touch Device", 28 pages.

Office action for U.S. Appl. No. 13/493,497, mailed on Mar. 20, 2015, Izadi et al., "Interacting With Physical and Digital Objects Via a Multi-Touch Device", 32 pages.

Office action for U.S. Appl. No. 13/493,497, mailed on Apr. 29, 2013, Izadi et al., "Interacting With Physical and Digital Objects Via a Multi-Touch Device", 28 pages.

Office Action for U.S. Appl. No. 13/109,765, mailed on Apr. 4, 2012, Kenneth P. Hinckley, "Extending Digital Artifacts Through An Interactive Surface", 20 pages.

Office action for U.S. Appl. No. 13/493,497, mailed on May 16, 2014, Izadi et al., "Interacting With Physical and Digital Objects Via a Multi-Touch Device", 31 pages.

Office Action for U.S. Appl. No. 13/109,765, mailed on Aug. 15, 2011, Kenneth P. Hinckley, "Extending Digital Artifacts Through An Interactive Surface", 17 pages.

Office action for U.S. Appl. No. 13/493,497, mailed on Sep. 11, 2012, Izadi et al., "Interacting With Physical and Digital Objects Via a Multi-Touch Device", 27 pages.

OA from U.S. Appl. No. 13/109,765; dated Aug. 15, 2011; 17 pages.

Patten et al., "Sensetable: A Wireless Object Tracking Platform for Tangible User Interfaces", Proceedings of CHI 2001, Mar. 31-Apr. 5, 2001, ACM Press, 8 pages.

Shen, et al., "Personal Digital Historian: Story Sharing Around the Table", ACM, Interactions, vol. 10, Issue 2, Mar. 2003, pp. 15-22.

"Socio-Digital Systems", available at least as early as Mar. 14, 2007, at <<http://research.microsoft.com/sds/>>, pp. 1-10.

"Swiss Ranger SR-2 Datasheet", CSEM, 2004, 1 page.

"The Sensel Morph: Interaction, Evolved," retrieved on Aug. 25, 2015 at <https://www.kickstarter.com/projects/1152958674/thesenselmorphinteractionevolved>, Sensel, pp. 1-29.

"Intuos", Published on: Nov. 29, 2014, available at: <<http://www.wacom.com/en-in/products/pen-tablets/intuos-pen-and-touch-medium>>, 6 pages.

Wilson, "PlayAnywhere: A Compact Interactive Tabletop Projection-Vision System", UIST '05, Oct. 23-27, 2005, pp. 1-10.

"Second Written Opinion Issued in PCT Application No. PCT/US2016/058106", Mailed Date: Jun. 14, 2017, 7 Pages.

"International Preliminary Report on Patentability Issued in PCT Application No. PCT/US2016/058106", Mailed Date: Aug. 7, 2017, 12 Pages.

Office Action for U.S. Appl. No. 13/109,765, mailed on Sep. 23, 2016, Hinckley et al., "Extending Digital Artifacts Through An Interactive Surface", 34 pages.

Office action for U.S. Appl. No. 13/109,765, mailed on Apr. 20, 2016, Hinckley et al., "Extending Digital Artifacts Through An Interactive Surface", 29 pages.

"International Search Report and Written Opinion" issued in PCT Application No. PCT/US2016/058106, mailed Mar. 21, 2017, 21 pages.

Office action for U.S. Appl. No. 13/493,497, mailed on May 9, 2017, Izadi et al., "Interacting With Physical and Digital Objects Via a Multi-Touch Device", 9 pages.

"First Office Action and Search Report Issued in Chinese Patent Application No. 201680064071.5", Mailed Date: Aug. 26, 2020, 12 Pages.

"Office Action Issued in European Patent Application No. 16794799.3", Mailed Date: Dec. 10, 2020, 5 Pages.

\* cited by examiner

COMPUTING DEVICE HAVING USER-INPUT ACCESSORY

BACKGROUND

Smartphones, desktop computers, and other computing devices can run a wide variety of software programs. Many of these programs are designed to interact with specific peripherals. For example, many smartphone apps are designed to operate in computing devices included or connected to multi-touch-capable touchscreens. Similarly, some graphics applications are configured to operate with pen tablets instead of or in addition to mice or other pointing devices. The user experience of an application can depend significantly on which peripherals are used to interact with the application.

SUMMARY

This disclosure describes devices, systems, methods, and computer-readable media for launching or operating an application in response to a user-input accessory selected by the user. In some examples, a computing device can include a wireless interrogator configured to wirelessly detect a first identifier associated with a tagged user-input accessory in operational proximity to the wireless interrogator and wirelessly detect a second identifier associated with a tagged object in operational proximity to the wireless interrogator. The computing device can include a force sensor having a sensing surface. The computing device can determine a software application corresponding to the first identifier and execute the determined software application. The computing device can detect a force exerted against the sensing surface by the object and provide to the software application information of the second identifier and information of the detected force. Example techniques described herein can detect spatially-varying forces across the sensing surface. In some example techniques described herein, a location or shape of the object can be determined and provided to the software application. In some example techniques described herein, a representation of the object can be presented for display in a user interface. In some example techniques described herein, the software application can display a user interface corresponding to the first identifier.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to devices, systems, methods, computer-readable instructions, engines, modules, algorithms, hardware logic, and/or operations as permitted by the context described above and throughout the document.

BRIEF DESCRIPTION OF THE DRAWINGS

The detailed description is described with reference to the accompanying figures. In the figures, the left-most digits of a reference number identifies the figure in which the reference number first appears. The same reference numbers in different figures indicate similar or identical items.

DETAILED DESCRIPTION

Overview

Figure 1:
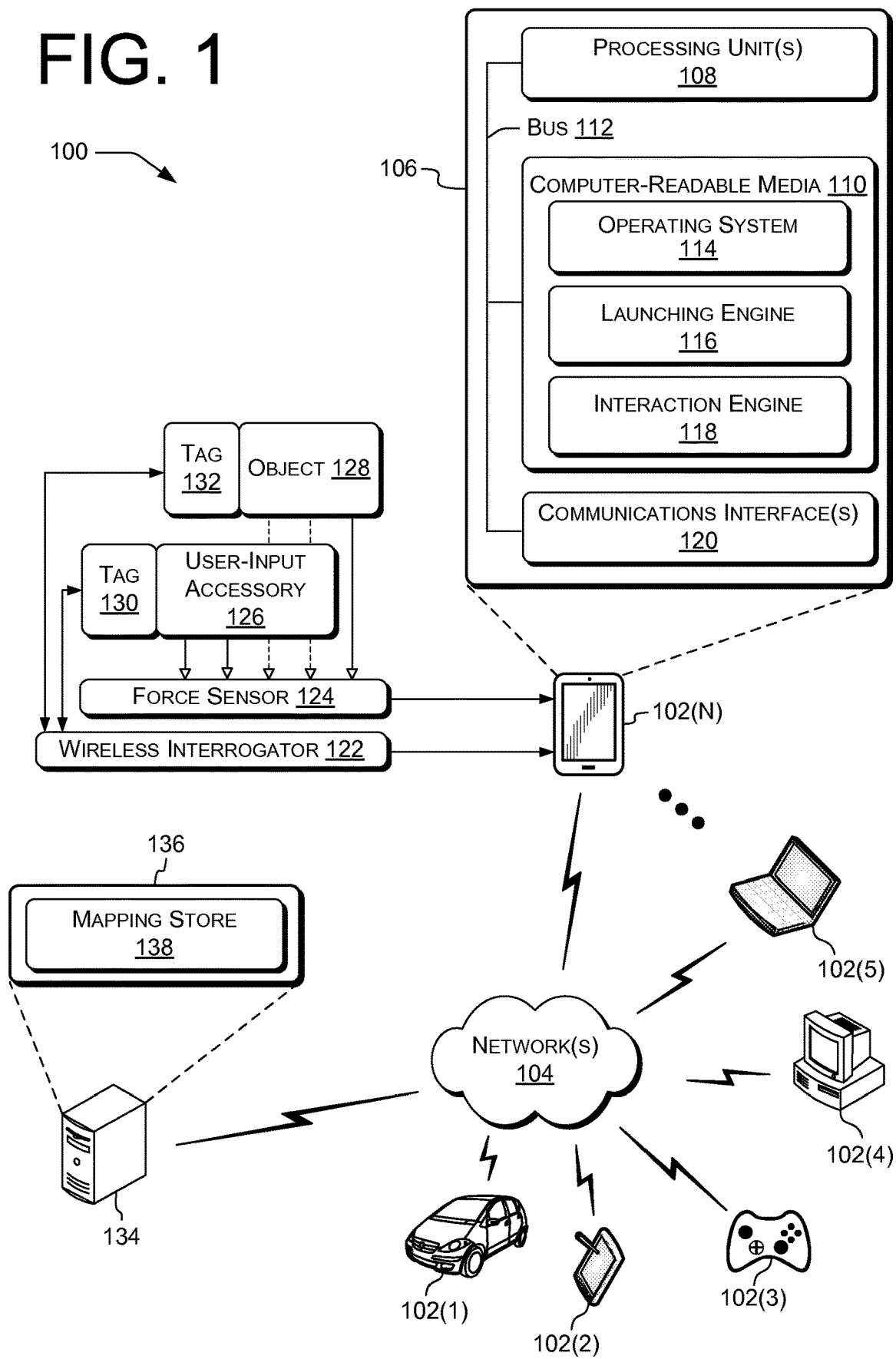
FIG. 1 is a block diagram depicting an example environment for implementing application selection and operation as described herein.

Examples described herein provide techniques and constructs to launch or operate an application in response to a user-input accessory (UIA) selected, e.g., by an entity, such as an operator entity or a user. In some examples, an application specific to the UIA can be launched. In some examples, user interfaces presented by the application can be adjusted based on the UIA. Either of app-specific launching and user-interface customizing can improve operational efficiency compared to using an application not designed for that UIA. A UIA is a computer peripheral, an attachment to a computer or computer peripheral, or an accessory (electronic or not) usable with a computer or computer peripheral. A UIA of any of these types is configured to afford specific user inputs or types of user inputs, i.e., to express or represent to a user the possibility of providing those inputs or types of user inputs. For example, a UIA showing a depiction of a painter's palette affords selecting a color, e.g., to be used in a computer paint program such as GIMP. Further examples of user-input accessories are described below.

The user experience of an application can change significantly, and operational efficiency with the application can be reduced, when the application is used with a peripheral other than that for which the application was designed. Some examples described herein permit using an application with the peripheral for which that application was designed. Some examples described herein permit automatically executing a software application or automatically configuring a software application based on a connected peripheral, reducing the time required to begin using the peripheral and increasing operational efficiency. Some examples described herein permit effectively manipulating virtual objects using corresponding physical objects, e.g., placed on a force-sensing surface. For example, physical objects, such as wooden or plastic blocks carrying radio-frequency identification (RFID) tags, can be used with a UIA affording placing or arranging objects on the UIA. For example, the UIA can show outlines indicating where blocks should be placed, or can be arranged horizontally to serve as a tray or other support for blocks. Further examples of objects are described below.

As used herein, the terms "application," "app," and "software program" refer generally to any software or portion thereof running on a computing device and responsive to or associated with user-input accessories as described herein. Examples of apps can include smartphone downloadable programs, desktop-computer programs such as word processors and spreadsheets, smartphone and other embedded operating systems, programs included with such operating systems such as shells or device-management subsystems, and embedded programs (e.g., firmware or software) running on sensor devices such as Internet of Things (IoT) devices. As used herein, the terms "application," "app," and "software program" also encompass hardwired logic included in a computing device and configured to respond to presence of, or signals from, a UIA as described herein.

Some examples, scenarios, and techniques for application responsiveness to user-input accessories are presented in greater detail in the following description of the figures.

Illustrative Environment

FIG. 1 shows an example environment 100 in which examples of devices or systems responsive to user-input accessories can operate or in which program-launching or -operation methods such as described below can be performed. In the illustrated example, various devices and/or components of environment 100 include computing devices 102(1)-102(N) (individually or collectively referred to herein with reference 102), where N is any integer greater than or equal to 1. Although illustrated as, e.g., desktop computers, laptop computers, tablet computers, or cellular phones, computing devices 102 can include a diverse variety of device categories, classes, or types and are not limited to a particular type of device.

By way of example and not limitation, computing devices 102 can include, but are not limited to, automotive computers such as vehicle control systems, vehicle security systems, or electronic keys for vehicles (e.g., 102(1), represented graphically as an automobile); smartphones, mobile phones, mobile phone-tablet hybrid devices, personal data assistants (PDAs), or other telecommunication devices (e.g., 102(2)); portable or console-based gaming devices or other entertainment devices such as network-enabled televisions, set-top boxes, media players, cameras, or personal video recorders (PVRs) (e.g., 102(3), represented graphically as a gamepad); desktop computers (e.g., 102(4)); laptop computers, thin clients, terminals, or other mobile computers (e.g., 102(5)); tablet computers or tablet hybrid computers (e.g., 102(N)); server computers or blade servers such as Web servers, map/reduce servers or other computation engines, or network-attached-storage units; wearable computers such as smart watches or biometric or medical sensors; implanted computing devices such as biometric or medical sensors; fixed sensors, such as IoT sensors, configured to monitor time, environmental conditions, vibration, motion, or other attributes of the world or structures or devices therein, e.g., bridges or dams; computer navigation client computing devices, satellite-based navigation system devices including global positioning system (GPS) devices and other satellite-based navigation system devices; or integrated components for inclusion in computing devices or appliances configured to participate in or carry out application selection or operation as described herein.

Different computing devices 102 or types of computing devices 102 can use different peripherals and can have different uses for those peripherals. Examples of peripherals can include user-input accessories such as those discussed below. For example, portable devices such as computing devices 102(2) and 102(N) can use peripherals designed to cooperate with the small sizes of those devices. Larger devices such as computing devices 102(4) and 102(5) can use peripherals that take advantage of physical desktop space, e.g., pen tablets.

In some examples, computing devices 102 can communicate with each other and/or with other computing devices via one or more networks 104. In some examples, computing devices 102 can communicate with external devices via networks 104. For example, networks 104 can include public networks such as the Internet, private networks such as an institutional or personal intranet, cellular networks, or combinations of private and public networks. Networks 104 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Networks 104 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, networks 104 can also include a number of devices that facilitate network communications or form a hardware infrastructure for the networks, such as switches, routers, gateways, access points, firewalls, base stations, repeaters, backbone devices, and the like. Networks 104 can also include devices that facilitate communications between computing devices 102 using bus protocols of various topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. The type of network 104 used for any given connection between, e.g., a computing device 102 and a computing cluster can be selected based on these characteristics and on the type of interaction. For example, a low-power, low-bandwidth network can be selected for IoT sensors, and a low-latency network can be selected for smartphones.

In some examples, networks 104 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Still referring to the example of FIG. 1, details of an example computing device 102(N) are illustrated at inset 106. The details of example computing device 102(N) can be representative of others of computing devices 102. However, individual ones of the computing devices 102 can include additional or alternative hardware and/or software components. Computing device 102(N) can include one or more processing units 108 operably connected to one or more computer-readable media 110 such as via a bus 112, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 108 can exchange data through an internal bus 112 (e.g., PCIe), rather than or in addition to network 104. While in this example the processing units 108 are described as residing on the computing device 102(N), the processing units 108 can also reside on different computing devices 102 in some examples. In some examples, at least two of the processing units 108 can reside on different computing devices 102. In such examples, multiple processing units 108 on the same computing device 102 can use a bus 112 of the computing device 102 to exchange data, while processing units 108 on different computing devices 102 can exchange data via networks 104.

Processing units 108 can be or include one or more single-core processors, multi-core processors, central processing units (CPUs), graphics processing units (GPUs), general-purpose GPUs (GPGPUs), or hardware logic components configured, e.g., via specialized programming from modules or Application Programming Interfaces (APIs), to perform functions described herein. For example, and without limitation, illustrative types of hardware logic components that can be used in or as processing units 108 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 108 can represent a hybrid device, such as a device from ALTERA or XILINX that includes a CPU core embedded in an FPGA fabric. These or other hardware logic components can operate independently or, in some instances, can be driven by a CPU. In some examples, at least some of computing devices 102 can include a plurality of processing units 108 of multiple types. For example, the processing units 108 in computing device 102(N) can be a combination of one or more GPGPUs and one or more FPGAs. Different processing units 108 can have different execution models, e.g., as is the case for graphics processing units (GPUs) and central processing unit (CPUs). In some examples, processing units 108, computer-readable media 110, and modules or engines stored on computer-readable media 110 can together represent an ASIC, FPGA, or other logic device configured to carry out the functions of such modules or engines. In some examples, an engine as described herein can include one or more modules.

Computer-readable media described herein, e.g., computer-readable media 110, includes computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 110 can store instructions executable by the processing units 108 that, as discussed above, can represent a processing unit incorporated in computing device 102. Computer-readable media 110 can additionally or alternatively store instructions executable by external processing units such as by an external CPU or external processor of any type discussed above. In some examples at least one processing unit 108, e.g., a CPU, GPU, or hardware logic device, is incorporated in computing device 102, while in some examples at least one processing unit 108, e.g., one or more of a CPU, GPU, or hardware logic device, is external to computing device 102.

Computer-readable media 110 can store, for example, executable instructions of an operating system 114, a launching engine 116, an interaction engine 118, and other modules, programs, or applications that are loadable and executable by processing units 108. In some examples not shown, one or more of the processing units 108 in one of the computing devices 102 can be operably connected to computer-readable media 110 in a different one of the computing devices 102, e.g., via communications interface 120 and network 104. For example, program code to perform steps of flow diagrams herein can be downloaded from a server, e.g., computing device 102(4), to a client, e.g., computing device 102(N), e.g., via the network 104, and executed by one or more processing units 108 in computing device 102(N). For example, the computer-executable instructions stored on the computer-readable media 110 can upon execution configure a computer such as a computing device 102 to perform operations described herein with reference to the operating system 114, the launching engine 116, or the interaction engine 118.

Computer-readable media 110 of the computing device 102 can store an operating system 114. In some examples, operating system 114 is not used (commonly referred to as a "bare metal" configuration). In some examples, operating system 114 can include components that enable or direct the computing device 102 to receive data via various inputs (e.g., user controls, network or communications interfaces, memory devices, or sensors), and process the data using the processing units 108 to generate output. The operating system 114 can further include one or more components that present the output (e.g., display an image on an electronic display, store data in memory, transmit data to another computing device, etc.). The operating system 114 can enable a user to interact with apps or with modules of the interaction engine 118 using a user interface (omitted for brevity). Additionally, the operating system 114 can include components that perform various functions generally associated with an operating system, e.g., storage management and internal-device management.

Computing device 102 can also include one or more communications interfaces 120 to enable wired or wireless communications between computing devices 102 and other networked computing devices 102 involved in application selection or operation, or other computing devices, over networks 104. Such communications interfaces 120 can include one or more transceiver devices, e.g., network interface controllers (NICs) such as Ethernet NICs or other types of transceiver devices, to send and receive communications over a network. The processing units 108 can exchange data through respective communications interfaces 120. In some examples, the communications interface 120 can be a PCIe transceiver, and the network 104 can be a PCIe bus. In some examples, the communications interface 120 can include, but is not limited to, a transceiver for cellular (3G, 4G, or other), WI-FI, Ultra-wideband (UWB), BLUETOOTH, or satellite transmissions. The communications interface 120 can include a wired I/O interface, such as an Ethernet interface, a serial interface, a Universal Serial Bus (USB) interface, an INFINIBAND interface, or other wired interfaces. For simplicity, these and other components are omitted from the illustrated computing device 102.

In some examples, a computing device 102 such as the computing device 102(N) can include or be connected with a wireless interrogator 122. The wireless interrogator 122 can be configured to wirelessly detect respective identifiers associated with tagged objects, e.g., by transmitting interrogation signals and receiving responses from tagged objects in operational proximity to the wireless interrogator 122. In some examples, the wireless interrogator 122 can include an RFID or near-field communications (NFC) reader configured to wirelessly detect the identifiers of RFID-tagged or NFC-tagged objects of the tagged objects. In some examples, the wireless interrogator 122 can include a reader configured to wirelessly detect the identifiers of ones of the tagged objects having transceivers for BLUETOOTH, BLUETOOTH Low-Energy (BLE), or other personal-area-networking (PAN) technologies. In some examples, the wireless interrogator 122 can include an optical detector configured to locate and decode visual indicia on or in surfaces of the tagged objects, e.g., barcodes, specific colors, or specific patterns.

Figure 3:
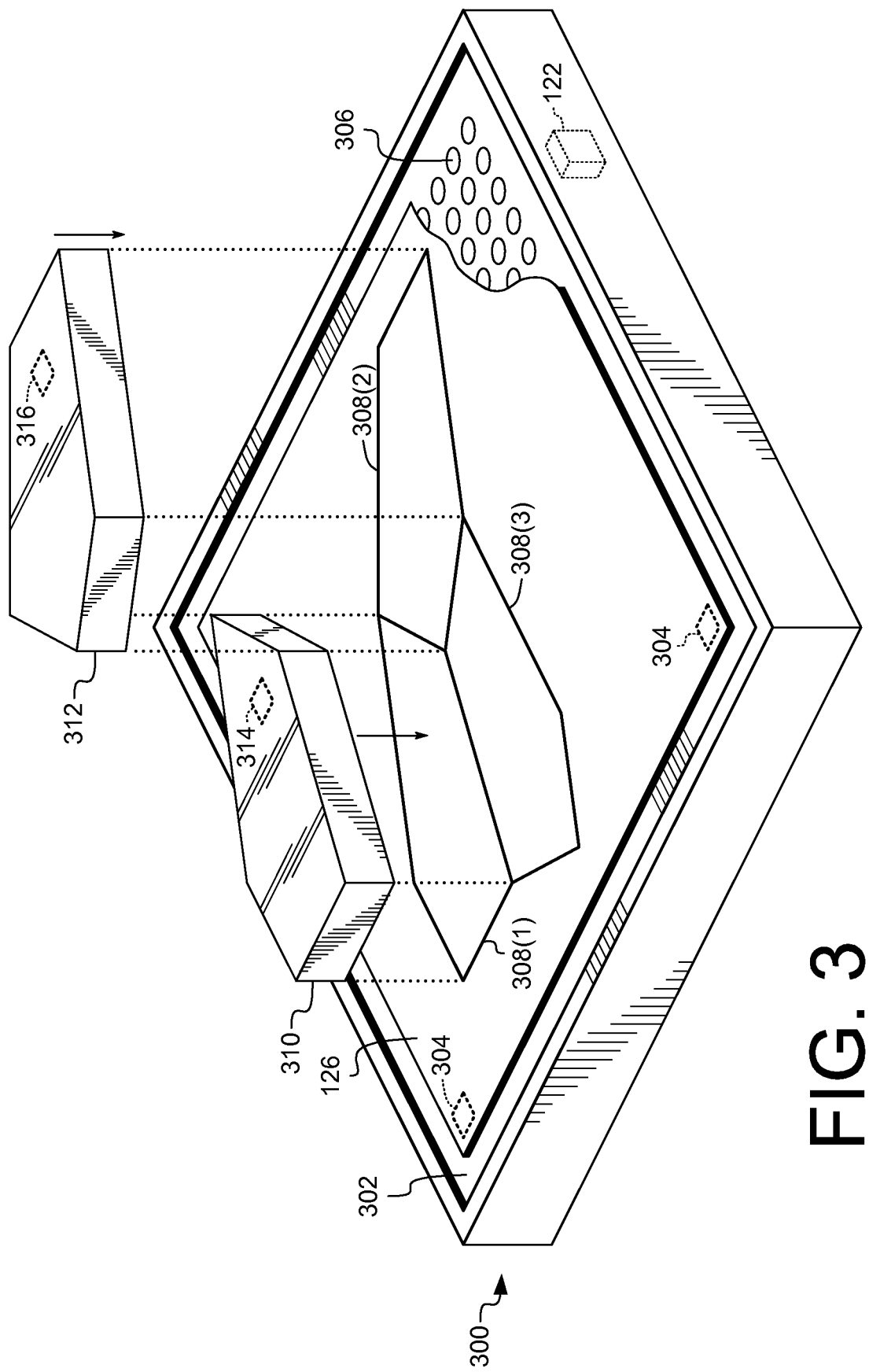
FIG. 3 is a perspective illustrating an example computing device and example uses thereof.

In some examples, a computing device 102 such as the computing device 102(N) can include or be connected with a force sensor 124. The force sensor 124 can have a sensing surface. The force sensor 124 can be configured to sense force, pressure, or other mechanical actions on or against the sensing surface. In some examples, the force sensor 124 can be configured to detect spatially-varying forces across the sensing surface. Example force sensors useful with various examples are described in U.S. Pat. No. 9,001,082 to Rosenberg et al. ("'082") assigned to SENSEL, Inc., incorporated herein by reference. For example, the force sensor 124 can include a two-dimensional variable-impedance array having column and row electrodes interconnected with nonzero impedances, e.g., as shown in FIG. 3 of '082. In some examples, the force sensor 124 can include one or more optical, resistive, or capacitive touch sensors or one or more capacitive or inductive proximity sensors. In some examples, the force sensor 124 can include one or more deformable membranes or strain gauges.

In some examples, the wireless interrogator 122 can be configured to detect a user-input accessory (UIA) 126 or an object 128 arranged in operational proximity to the wireless interrogator 122, e.g., in a sensing range thereof. In the illustrated example, the UIA 126 is associated with (e.g., is attached to or includes) a tag 130, e.g., an RFID tag. Also in the illustrated example, the object 128 is associated with a tag 132, e.g., an RFID tag. The wireless interrogator 122 can detect identifiers (e.g., class, object, vendor, product, or unique identifiers) or other information stored in the tags 130 or 132, e.g., when the tags 130 or 132 are in operational proximity to the wireless interrogator 122, e.g., in the sensing range thereof. In some examples, the wireless interrogator 122 can store or update information in the tags 130 or 132. For example, the wireless interrogator 122 can wirelessly detect a first identifier associated with the tagged user-input accessory 126 in operational proximity to the wireless interrogator 122, and wirelessly detect a second identifier associated with the tagged object 128 in operational proximity to the wireless interrogator 122. Further examples are discussed below with reference to FIG. 3.

In some examples, the force sensor 124 can be configured to detect the UIA 126 or the object 128 arranged in operational proximity to the force sensor 124. For example, as graphically represented by the open-headed arrows in FIG. 1, the UIA 126 or the object 128 can exert a force against a sensing surface of the force sensor 124. The force sensor 124 can detect, e.g., the presence, magnitude, magnitude per area (i.e., pressure), or direction of such a force, whether exerted against the sensing surface directly or indirectly. Example forces exerted directly against the sensing surface are graphically represented by solid arrow shafts; example forces exerted indirectly against the sensing surface (e.g., by the object 128 through the UIA 126) are graphically represented by stippled arrow shafts. For example, the object 128 can be arranged above and supported by the UIA 126 or the force sensor 124, and exert gravitational force (weight) against the force sensor 124. Examples of the force sensor 124 are discussed in more detail below with reference to FIG. 4. In some examples, the UIA 126 can include a pad configured to overlie the force sensor 124 or the sensing surface of the force sensor 124. The pad can include, e.g., a deformable sheet, e.g., comprising a thermoplastic material. In some examples, the UIA 126 and force sensor 124 can be arranged in any orientation. For example, the UIA 126 and force sensor 124 can be arranged horizontally, e.g., to support object 128 thereupon. In another example, the UIA 126 and force sensor 124 can be arranged vertically, e.g., to detect lateral forces exerted by or via object 128.

In some examples, the UIA 126 can be selected by an entity. In some examples, the UIA 126 can be placed by the entity into operational proximity to, or operational arrangement with, the wireless interrogator 122 or the force sensor 124. The entity can be, for example, a robot or other robotic operator, which may not be directly controlled by a human user. For example, the entity can be a manufacturing robot, e.g., configured to pick and place the UIA 126. In various examples, the entity can be a robotic assistance device such as a powered prosthesis or exoskeleton or a robotic remote manipulator ("waldo"). In some examples, the operator can be a human user and the UIA 126 can be selected by the human user.

In some examples, the computing device 102(N) is communicatively connected, e.g., via the network 104, with a computing device 134, e.g., a cloud or other server. In some examples, as indicated, computing devices, e.g., computing devices 102 and 134, can intercommunicate to participate in or carry out application selection or operation as described herein. The computing device 134 can include components shown at inset 106. As shown at inset 136, the computing device 134 can additionally or alternatively include one or more computer-readable media (omitted for brevity) including a mapping store 138 holding one or more mappings from identifiers of user-input accessories such as the UIA 126 to indications of software applications corresponding to those identifiers. Examples of the mapping store 138 and the mappings are discussed in more detail below with reference to FIG. 4.

In some examples, the computing device 134 or one or more of the computing devices 102 can be computing nodes in a computing cluster, e.g., a cloud service such as MICROSOFT AZURE. Cloud computing permits computing resources to be provided as services rather than a deliverable product. For example, in a cloud-computing environment, computing power, software, information, and/or network connectivity are provided (for example, through a rental agreement) over a network, such as the Internet. In the illustrated example, computing devices 102 can be clients of a cluster including the computing device 134 and can submit jobs, e.g., including identifiers of UIAs 126, to the cluster and/or receive job results, e.g., indications of software applications, from the cluster. Computing devices in the cluster can, e.g., share resources, balance load, increase performance, or provide fail-over support or redundancy.

Illustrative Components

Figure 2:
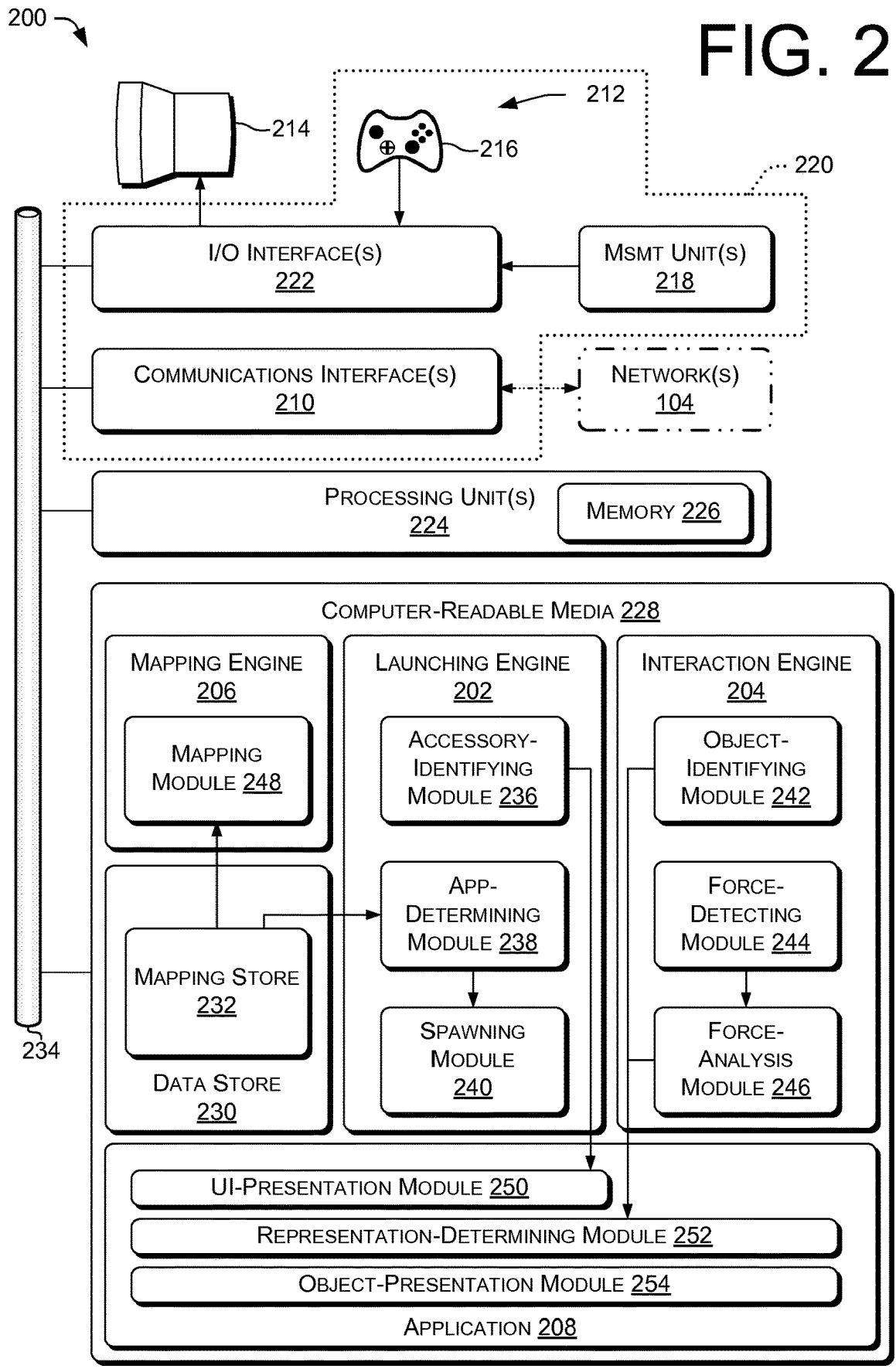
FIG. 2 is a block diagram depicting an example computing device configured to participate in application selection and operation according to various examples described herein.

FIG. 2 is an illustrative diagram that shows example components of a computing device 200, which can represent computing devices 102 or 134, and which can be configured to participate in application selection or operation according to various examples described herein. Computing device 200 can implement a launching engine 202, which can represent launching engine 116, FIG. 1. Computing device 200 can implement an interaction engine 204, which can represent interaction engine 118, FIG. 1. Computing device 200 can implement a mapping engine 206. Computing device 200 can implement a software application 208, e.g., configured for interaction with a user.

In some examples, e.g., of a computing device 134 providing a mapping service, the computing device 200 can implement mapping engine 206 but not launching engine 202, interaction engine 204, or software application 208. In some examples, e.g., of a computing device 102 making use of a mapping service, the computing device 200 can implement launching engine 202, interaction engine 204, or software application 208 but not mapping engine 206. In some examples, e.g., of a computing device 102 implementing both a mapping service and the use thereof, the computing device 200 can implement launching engine 202, interaction engine 204, mapping engine 206, and software application 208.

The computing device 200 can include or be connected to a communications interface 210, which can represent communications interface 120. For example, communications interface 210 can include a transceiver device such as a network interface controller (NIC) to send and receive communications over a network 104 (shown in phantom), e.g., as discussed above. As such, the computing device 200 can have network capabilities. For example, the computing device 200 can exchange data with other computing devices 102 or 134 (e.g., laptops, computers, and/or servers) via one or more networks 104, such as the Internet.

The computing device 200 can include or be connected to user-interface hardware 212. User-interface hardware 212 can include a display 214 or other device(s) configured to present user interfaces, e.g., as described below. Display 214 can include an organic light-emitting-diode (OLED) display, a liquid-crystal display (LCD), a cathode-ray tube (CRT), or another type of visual display. Display 214 can be a component of a touchscreen, or can include a touchscreen. In addition to or instead of the display 214, the user-interface hardware 212 can include various types of output devices configured for communication to a user or to another computing device 200. Output devices can be integral or peripheral to computing device 200. Examples of output devices can include a display, a printer, audio speakers, beepers, or other audio output devices, a vibration motor, linear vibrator, or other haptic output device, and the like. In some examples, the interaction engine 206 is operatively coupled to the display 214 or another output device.

User-interface hardware 212 can include a user-operable input device 216 (graphically represented as a gamepad). User-operable input device 216 can include various types of input devices, integral or peripheral to computing device 200. The input devices can be user-operable, or can be configured for input from other computing device 200. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, a grip sensor, an accelerometer, another haptic input, a visual input device such as one or more cameras or image sensors, and the like.

In some examples, computing device 102 can include one or more measurement units 218. Measurement units 218 can detect physical properties or status of computing device 200 or its environment. Examples of measurement units 218 can include units to detect motion, temperature, force, pressure, light, sound, electromagnetic radiation (e.g., for wireless networking), or any detectable form of energy or matter in or within sensing range of computing device 200. For example, the measurement units 218 can include the wireless interrogator 122 and/or the force sensor 124, FIG. 1. Individual measurement units of the measurement units 218 can be configured to output data corresponding to at least one physical property, e.g., a physical property of the computing device 200, such as acceleration, or of an environment of the computing device 200, such as temperature or humidity.

In some examples, e.g., of a smartphone computing device 200, measurement units 218 can include an accelerometer, a microphone, or front- and rear-facing cameras. In some examples, measurement units 218 can include a motion sensor, a proximity detector (e.g., for nearby life forms, people, or devices), a light sensor (e.g., a CdS photoresistor or a phototransistor), a still imager (e.g., a charge-coupled device, CCD, or complementary metal-oxide-semiconductor, CMOS, sensor), a video imager (e.g., CCD or CMOS), a microphone, a fingerprint reader, a retinal scanner, an iris scanner, or a touchscreen (e.g., in or associated with a display in user-interface hardware 212, such as display 214).

In some examples, computing device 102 can include one or more sensors 220. Components of communications interface 210, e.g., transceivers for BLUETOOTH, WI-FI, RFID, NFC, or LTE, can be examples of sensors 220. Such components can be used to, e.g., detect signals corresponding to characteristics of accessible networks. Such signals can also be detected by automatically locating information in a table of network information (e.g., cell-phone tower locations), or by a combination of detection by component of communications interface 120 and table lookup. Input components of user-interface hardware 212, e.g., touchscreens or phone mouthpieces, can also be examples of sensors 220. Measurement units 218 can also be examples of sensors 220. In some examples, a particular device can simultaneously or selectively operate as part of two or more of communications interface 210, user-interface hardware 212, and one or more measurement units 218. For example, a touchscreen can be an element of user-interface hardware 212 and used to present information and receive user commands. Signals from the same touchscreen can also be used in determining a user's grip on computing device 200. Accordingly, that touchscreen in this example is also a sensor 220.

Computing device 200 can further include one or more input/output (I/O) interfaces 222 by which computing device 200 can communicate with input, output, or I/O devices (for clarity, some not depicted). Examples of such devices can include components of user-interface hardware 212 or sensors 220. Computing device 200 can communicate via I/O interface 222 with suitable devices or using suitable electronic/software interaction methods. Input data, e.g., of user inputs on user-operable input device 216, can be received via I/O interfaces 222, and output data, e.g., of user interface screens, can be provided via I/O interfaces 222 to display 214, e.g., for viewing by a user.

The computing device 200 can include one or more processing units 224, which can represent processing units 108. In some examples, processing units 224 can include or be connected to a memory 226, e.g., a random-access memory (RAM) or cache. Processing units 224 can be operably coupled, e.g., via the I/O interface 222, to the user-interface hardware 212 and/or the sensors 220. Processing units 224 can be operably coupled to at least one computer-readable media 228, discussed below. Processing units 224 can include, e.g., processing unit types described above such as CPU- or GPGPU-type processing units.

The processing units 224 can be configured to execute modules of the plurality of modules. For example, the computer-executable instructions stored on the computer-readable media 228 can upon execution configure a computer such as a computing device 200 to perform operations described herein with reference to the modules of the plurality of modules, e.g., modules of the launching engine 202, interaction engine 204, mapping engine 206, or software application 208. The modules stored in the computer-readable media 228 can include instructions that, when executed by the one or more processing units 224, cause the one or more processing units 224 to perform operations described below. Examples of modules in computer-readable media 228 are discussed below. Computer-readable media 228 can also include an operating system, e.g., operating system 114.

In the illustrated example, computer-readable media 228 includes a data store 230. In some examples, data store 230 can include data storage, structured or unstructured, such as a database (e.g., a Structured Query Language, SQL, or NoSQL database) or data warehouse. In some examples, data store 230 can include a corpus or a relational database with one or more tables, arrays, indices, stored procedures, and so forth to enable data access. Data store 230 can store data for the operations of processes, applications, components, or modules stored in computer-readable media 228 or computer instructions in those modules executed by processing units 224. In some examples, the data store can store computer program instructions (omitted for brevity), e.g., instructions corresponding to apps, to processes described herein, or to other software executable by processing units 224, a mapping store 232, which can represent the mapping store 138, or any combination thereof. In some examples, the computer program instructions include one or more program modules executable by the processing units 224, e.g., program modules of an app.

In some examples, the processing units 224 can access the modules on the computer-readable media 228 via a bus 234, which can represent bus 112, FIG. 1. I/O interface 222 and communications interface 210 can also communicate with processing units 224 via bus 234.

The launching engine 202 stored on computer-readable media 228 can include one or more modules, e.g., shell modules, or API modules, which are illustrated as a accessory-identifying module 236, an app-determining module 238, and a spawning module 240.

The interaction engine 204 stored on computer-readable media 228 can include one or more modules, e.g., shell modules, or API modules, which are illustrated as an object-identifying module 242, a force-detecting module 244, a force-analysis module 246.

The mapping engine 206 stored on computer-readable media 228 can include one or more modules, e.g., shell modules, or API modules, which are illustrated as a mapping module 248.

The software application 208 stored on computer-readable media 228 can include one or more modules, e.g., shell modules, or API modules, which are illustrated as a user-interface (UI) presentation module 250, a representation-determining module 252, and an object-presentation module 254.

The launching engine 202, interaction engine 204, mapping engine 206, or software application 208 can be embodied in a cloud service, or on a computing device 102 controlled by a user, or any combination thereof. Module(s) stored on the computer-readable media 228 can implement inter-process communications (IPC) functions or networking functions to communicate with servers or other computing devices 102 or 134.

In the launching engine 202, the interaction engine 204, the mapping engine 206, or the software application 208, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the object-identifying module 242 and the force-detecting module 244, or the accessory-identifying module 236 and the force-detecting module 244, can be combined in a single module that performs at least some of the example functions described below of those modules. In another example, the accessory-identifying module 236 and the object-identifying module 242 can be combined in a single module that performs at least some of the example functions described below of those modules. In still another example, the app-determining module 238 and the mapping module 248 can be combined in a single module that performs at least some of the example functions described below of those modules. These and other combined modules can be shared by or accessible to more than one of the launching engine 202, the interaction engine 204, the mapping engine 206, or the software application 208. In some examples, computer-readable media 228 can include a subset of modules 236, 238, 240, 242, 244, 246, 248, 250, 252, or 254.

FIG. 3 is a perspective illustrating an example computing device 300, and example uses thereof. The computing device 300 can represent computing devices 102, 134, or 200. Computing device 300 can additionally or alternatively represent a peripheral, e.g., a user-operable input device 216, communicatively connectable with a computing device 102, 134, or 200.

Computing device 300 includes the force sensor 124 (FIG. 1; omitted here for brevity) having a sensing surface 302. The UIA 126 is arranged over the sensing surface 302 in this example; however, other arrangements can be used.

The computing device 300 includes mounting features 304 configured to retain the UIA 126 in operational relationship with the sensing surface 302. The UIA 126 can include mating features (omitted for brevity) configured to attach, affix, or otherwise hold to the mounting features 304. The mounting features 304 or the mating features can include, e.g., one or more magnets, pins, sockets, snaps, clips, buttons, zippers, adhesives (permanent, semi-permanent, or temporary), nails, screws, bolts, studs, points, or kinematic mounts or mating features of any of those. In some examples, the UIA 126 can include batteries or other electronics. In some examples, the UIA 126 can omit batteries or other power supplies and operate, e.g., based on inductively-coupled power transfers from the computing device 300.

In the illustrated example, the force sensor 124 includes a plurality of sensing elements 306 distributed across the sensing surface 302, graphically represented as ellipses. For clarity, only one of the sensing elements 306 is labeled. The sensing elements can be distributed regularly, e.g., in a grid arrangement (as illustrated), irregularly, randomly, or according to any other pattern or arrangement. The sensing elements can include, e.g., resistive or capacitive touch sensors or strain gauges.

In the illustrated example, the UIA 126 includes the outlines 308(1)-308(3) (individually or collectively referred to herein with reference 308) of three abutting irregular pentagons. This UIA 126 can be used, e.g., to assist young children in developing fine-motor skills or learning how to arrange shapes. In this and other examples, the UIA 126 can include outlines (or other tactile or visual indicia, and likewise throughout this paragraph) of positions or orientations of objects or groups of objects. Such a UIA 126 can be used, e.g., to teach shape identification, sorting, or arranging, or relationships between entities represented by the objects. For example, the UIA 126 can include the relative positions of the planets in a depiction of the solar system, and the objects can represent the planets. In some examples, the UIA 126 can include the outline of a completed tangram puzzle but not the inner lines showing how the tangram pieces should be oriented. In some examples, the UIA 126 can include a schematic outline of a molecule, e.g., a DNA double helix, and the objects can include representations of portions of the molecule. These and other examples can permit using the computing device 300 with the UIA 126 as an educational tool.

In some examples, the UIA 126 can include outlines or other indicia of tools or input interfaces such as, e.g., a painter's palette, a painting or drawing canvas, a music controller such as a MIDI (Musical Instrument Digital Interface) controller, a piano, an organ, a drum pad, a keyboard such as a QWERTY keyboard, a video game controller, or a multiple-choice answer form (e.g., having respective buttons for choices "A," "B," and so on). These and other examples can permit using the computing device 300 with the UIA 126 as an input interface that can supplement or replace a keyboard or pointing device.

In some examples, the UIA 126 can include combinations of any of the above examples. In some examples, the UIA 126 can include multiple regions and at least two of the regions can have indicia corresponding to respective, different ones of the above examples.

In some examples, the UIA 126 can correspond with a design environment. The software application 208 can present representations of one or more objects arranged over the UIA 126. For example, multiple gears can be placed on the UIA 126, and the software application 208 can present an animated representation showing how the gears would interlock and interact while turning. In another example, objects representing parts of a robot can be placed on the UIA 126, and the software application 208 can present an animated representation showing the robot having those parts assembled according to the spatial relationships between the objects on the UIA 126. As the user moves objects on the UIA 126, the software application 208 can reconfigure the representation of the object accordingly. In still another example, building blocks can be placed on the UIA 126, and the software application 208 can present a representation showing how the blocks can stack or interlock to form a structure. In some examples, data of the magnitude of force can be used to determine whether multiple objects are stacked on top of each other. In some examples, a database of object attributes can be queried with the object identifier to determine a 3-D model or extent of the object or a representation corresponding to the object.

Returning to the illustrated example of shape placement, two objects 310 and 312, which can represent object 128, FIG. 1, are illustrated over the corresponding outlines on the UIA 126. In the illustrated example, objects 310 and 312 include respective tags 314 and 316, e.g., RFID or NFC tags, carrying identifiers of the respective objects 310 and 312. In some examples, objects 310 and 312 have identifiers printed on surfaces thereof, e.g., in the form of barcodes or specific colors or patterns. When the UIA 126 or either of the objects 310 or 312 approaches the computing device 300, the wireless interrogator 122 can determine a respective identifier of that UIA 126 or that one of the objects 310 and 312.

In various examples, when either of the objects 310 and 312 is placed on the sensing surface 302 or on the UTA 126 arranged over the sensing surface 302, a force can be exerted against the sensing surface 302, e.g., because of gravity or a user's pressing the object 310 or 312 against the sensing surface 302. The force sensor 124 can detect and provide information of this force, as discussed below with reference to the force-analysis module 246, FIG. 4.

Figure 4:
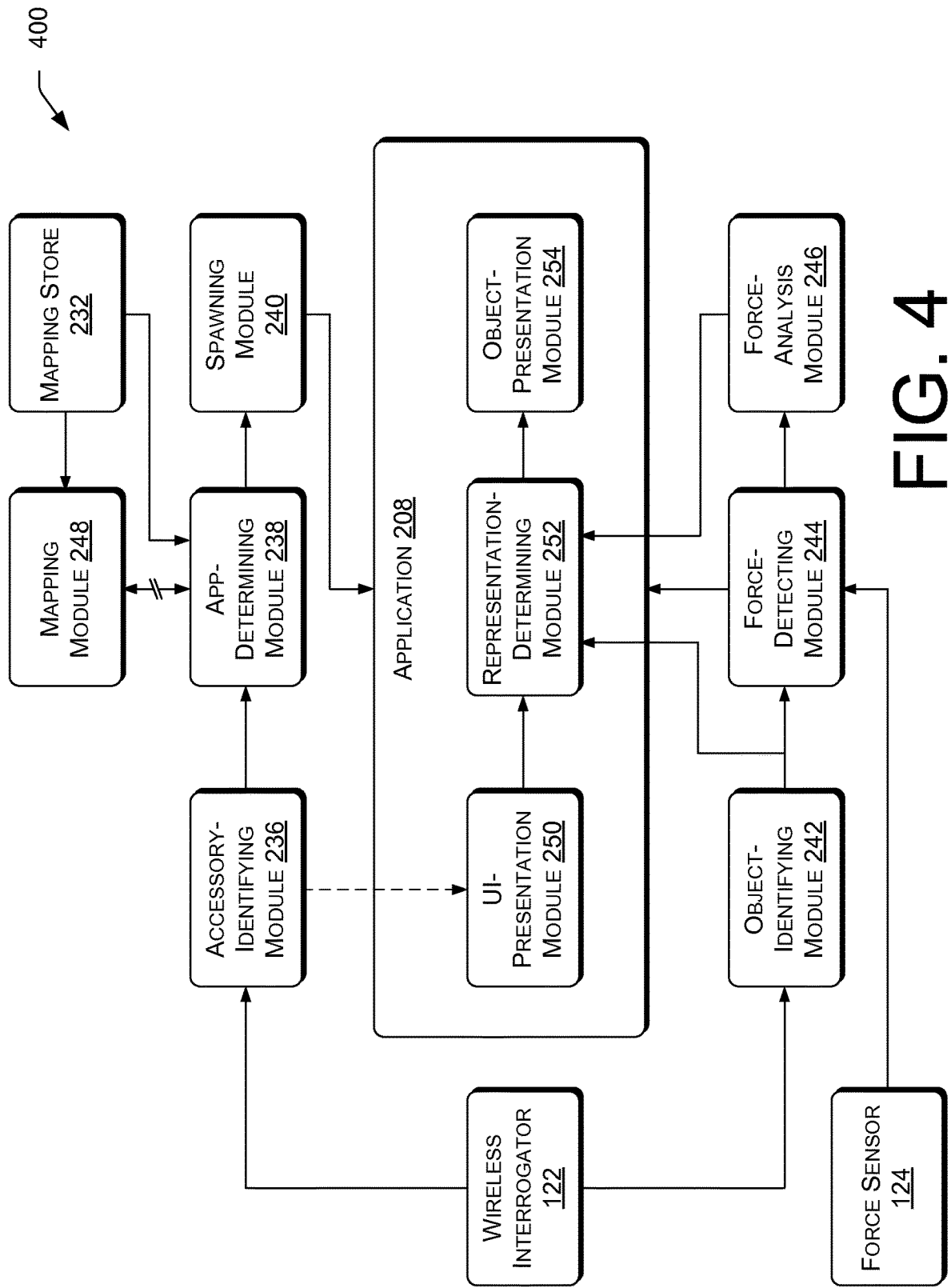
FIG. 4 is a dataflow diagram depicting example module interactions during application selection and operation.

FIG. 4 is a dataflow diagram 400 illustrating example interactions between the modules illustrated in FIG. 2, e.g., during application selection and operation. Some of the modules make use of a mapping store 138 or 232, e.g., holding mappings between identifiers of UIAs 126 and software applications such as software application 208, FIG. 2.

In some examples, the accessory-identifying module 236 can be configured to, using the wireless interrogator 122, detect a first identifier corresponding to the UIA 126 in operational proximity to the wireless interrogator 122. For example, the accessory-identifying module 236 can read the identifier of the UIA 126 from an RFID or NFC tag or another storage device in, on, or associated with the UIA 126. The accessory-identifying module 236 can be configured to detect (or attempt to detect) the first identifier, e.g., automatically when or after the UIA 126 enters operational proximity to the wireless interrogator 122 (e.g., a sensing range of the wireless interrogator 122), in response to a actuation of a user-input control such as a "connect" or "activate" button, or on a schedule (e.g., every 0.5 s).

In some examples, the app-determining module 238 can be configured to determine a software application 208 corresponding to the first identifier. For example, the app-determining module can determine the software application 208 using the stored mapping(s) in mapping store 232 of identifiers to software applications, e.g., by querying the mapping store 232 with the first identifier. In some examples, the app-determining module 238 can be configured to look up software applications in a centralized location, e.g., as is done to map file extensions to applications in MICROSOFT WINDOWS using the Registry (in which HKEY_CLASSES_ROOT has entries mapping extensions to programmatic identifiers, ProgIDs, and entries mapping ProgIDs to Component Object Model, COM, class identifiers, CLSIDs, and entries mapping CLSIDs to filenames of software applications), or as is done to map USB Vendor ID (VID)/Product ID (PID) pairs to device drivers using INF driver-information files.

In some examples, the app-determining module 238 can be configured to determine the software application 208 corresponding to the first identifier by transmitting the first identifier via the communications interface 210, FIG. 2. For example, the app-determining module 238 can transmit the first identifier to a mapping module 248, e.g., executing on a computing device 134, FIG. 1. The mapping module 248 can determine the software application 208 using the mapping(s) stored in mapping store 232, and transmit an indication of the determined software application 208. The app-determining module 238 can then receive the indication of the determined software application 208 via the communications interface 210.

In some examples using the mapping module 248, as well as in some examples in which the app-determining module 238 directly queries the mapping store 232, the mapping store 232 can store data indicating which software application corresponds to the first identifier. The first identifier (and other identifiers herein) can include one or more of, e.g., a universally unique identifier (UUID) or globally unique identifier (GUID); a uniform resource locator (URL), uniform resource name (URN), uniform resource identifier (URI), Digital Object Identifier (DOI), domain name, or reverse domain name; a unique hardware identifier such as an Ethernet Media Access Control (MAC) address, a 1-WIRE device serial number, or a GS1 Electronic Product Code (EPC), e.g., in URI form or stored in EPC Binary Encoding on, e.g., an RFID tag; a platform-specific app identifier (e.g., a GOOGLE PLAY package name); or a public key or public-key hash. The indication data can include one or more of, e.g., a name, filename, file path, or registry path; a MICROSOFT WINDOWS ProgID, CLSID, or COM interface ID (IID), or a corresponding identifier in Common Object Request Broker Architecture (CORBA) or another object system; or an identifier of any of the types listed above with reference to the first identifier.

In a specific, nonlimiting example, the first identifier can be a UUID. The first identifier can be stored as a 128-bit value, e.g., the hexadecimal value 0x5258AC20517311E59F4F0002A5D5C51B, or as a human-readable string, e.g., "{5258ac20-5173-11e5-9f4f-0002a5d5c51b}". The mapping store 232 can include a mapping associating the 128-bit first identifier, in either form or another form, with a specific software program, e.g., the reverse domain name "com.microsoft.exchange.mowa" to identify the MICROSOFT OUTLOOK WEB APP for ANDROID.

In some examples, mappings stored in the mapping store 232 can be cryptographically signed, e.g., using signatures according to the Public-Key Cryptography Standard (PKCS) #1 or another public-key cryptosystem. For example, a hash such as a Secure Hash Algorithm-256 bit (SHA-256) hash can be computed for a mapping in the mapping store 232. The hash can then encrypted with a predetermined private key. The encrypted hash can be stored in the mapping store 232 in association with the hashed mapping.

In some examples using cryptographically-signed mappings, the app-determining module 238 can select only software applications indicated in mappings having valid cryptographic signatures. For example, the app-determining module 238 can locate a candidate one of the mappings in the mapping store 232 based at least in part on the identifier of the UTA 126. The app-determining module 238 can decrypt the signature of the candidate mapping using a predetermined public key and compare the decrypted hash to the hash of the candidate mapping. If the hashes match, the candidate mapping was provided by a holder of the private key corresponding to the predetermined public key. In this situation, the app-determining module 238 can determine that the candidate mapping is valid and that the indicated software application 208 can be used. Using cryptographically-signed mappings can improve system security by reducing the chance that a mapping for, e.g., a malware program or Trojan horse will be selected by the app-determining module 238. In some examples, the app-determining module 238 can provide a warning, e.g., an "are you sure?" prompt, before selecting a software application indicated in a mapping not having a valid cryptographic signature.

In some examples, determining a software application corresponding to the first identifier can include selecting one of the mappings, e.g., in the mapping store 232, corresponding to the first identifier. A cryptographic signature of the selected one of the mappings can then be verified. If the cryptographic signature is not verified, a different one of the mappings can be selected from the mapping store 232, a warning can be presented, e.g., via a user interface, or processing can terminate without determining an application. In some examples, the spawning module 240 or the mapping module 248 can perform these or other functions of the app-determining module 238 related to verifying cryptographic signatures of mappings, or any two or more of the spawning module 240, the mapping module 248, and the app-determining module 238 can divide these functions between them. In some examples, in response to verification of the cryptographic signature, the spawning module 240 can execute the software application indicated in the verified mapping.

In some examples, the spawning module 240 can be configured to execute the determined software application 208. For example, the spawning module 240 can include a loader, such as a relocating or dynamic-linking loader, configured to read processor-executable instructions from a disk image of the determined software application 208 and place those instructions in main memory to be executed.

In some examples, the spawning module 240 can be configured to determine whether the determined software application 208 is available to be executed. Applications can be available if, e.g., they are loaded on local storage of computing device 102 or on storage accessible to computing device 102 via a network. In some examples, if the determined software application 208 is not available or unavailable to be executed, the spawning module 240 can execute an installation package of the determined software application 208 to make the determined software application 208 available, and can then execute the determined software application 208. In some examples, if the determined software application 208 is not available to be executed, the spawning module 240 can execute a user interface configured to permit the user to locate, download, or purchase the determined software application 208. In some examples, the user interface is configured to, when executed, present an indication of the determined software application 208; receive payment information; and, at least partly in response to the received payment information (e.g., based at least in part on exchanging payment and authorization data with a payment server), download the determined software application. The spawning module 240 can then execute the determined software application 208 once the determined software application 208 is available. This can permit, e.g., distributing a set of mappings, e.g., via automatic updates to operating system 114. The mappings can be distributed without regard to which applications are installed on a particular computer. This can provide increased user efficiency, since a user employing a new UTA 126 for the first time can be automatically prompted to download the determined software application 208. This can save network bandwidth and user time compared to requiring the user to manually locate the determined software application 208.

In some examples, the object-identifying module 242 can be configured to, using the wireless interrogator 122, detect a second identifier corresponding to an object in operational proximity to the wireless interrogator 122. The object-identifying module 242 can detect the second identifier in any of the ways for detecting identifiers described above with reference to the accessory-identifying module 236, e.g., periodically polling for tags using an RFID reader.

In some examples, the force-detecting module 244 can be configured to detect a force exerted against the sensing surface 302 of the force sensor 124 by the object. This can be done, e.g., as discussed above with reference to FIGS. 2 and 3. In some examples, the object-identifying module 242 or the force-detecting module 244 can be configured to provide information of the second identifier and information of the detected force, e.g., to the software application 208 or to the force-analysis module 246. The information can include, e.g., spatial data of the object (e.g., the object 310 or 312, FIG. 3). For example, the information can be transmitted via a kernel-process or interprocess communication channel such as a socket, pipe, or callback, or can be retrieved by the software application via an API call. In some examples, the force sensor 124 can be configured to detect spatially-varying forces across the sensing surface, e.g., using a plurality of sensing elements distributed across the sensing surface. The information of the detected force can include information of the spatially-varying forces.

In some examples, the force-analysis module 246 can be configured to determine a location of the object based at least in part on the detected spatially-varying forces. The force-analysis module 246 can then provide to the software application 208 information of the determined location. In some examples, the spatial data of the object 310 or 312 can include location data of the object, e.g., with respect to the sensing surface 302 or the UTA 126. For example, bitmap data of magnitudes of the spatially-varying forces can be processed using object- or feature-detection image-processing algorithms such as edge tracing, gradient matching, the Speeded Up Robust Features (SURF) feature detector, or (e.g., for a single object) location-weighted summing. Once a shape is located, the centroid can be determined using location-weighted summing over the pixels of the bitmap data considered to lie within the shape.

In some examples, the force-analysis module 246 can be configured to determine a shape of the object based at least in part on the detected spatially-varying forces. The force-analysis module 246 can then provide to the software application 208 information of the determined shape. In some examples, the spatial data of the object can include shape data of the object, e.g., coordinates of an outline of the shape or a raster map of force readings corresponding to the shape(s) of surface(s) of the object exerting force against the sensing surface 302. For example, shapes can be detected in bitmap force-magnitude data as noted above with respect to shape location. Pixels considered to lie within the shape can then be outlined, e.g., by fitting, e.g., cubic or quadratic Bezier curves or other polynomials to the edges defined by borders between those pixels and pixels not considered to lie within the shape. The Sobel, Canny, or other edge detectors can be used to locate edges. The potrace, Autotrace, or other algorithms can be used to trace, e.g., edges or centerlines of pixel regions to provide the shape information. In some examples, determined bitmap or outline data of a shape can be compared to a catalog of known shapes to provide shape data such as "triangle" or "square."

In some examples, information associated with the identifier of an object can be used together with the force data for that object to determine where that object is. For example, when the wireless interrogator detects multiple objects and the force sensor has discrete regions of force data for those objects, the determined shapes of the objects can be correlated with the identifiers, e.g., using a database lookup or a shape catalog, to determine spatial data associated with each of the shape identifiers.

In some examples, the spatial data can include one or more bitmap representations of the detected spatially-varying forces or portions thereof. For example, the spatial data can include a raw bitmap (rasterized) representation of the spatially-varying forces, e.g., detected by a regular grid of force sensors. The bitmap can represent the entire active area of the force sensor 124 or only a portion thereof, e.g., a portion in which force greater than a threshold or noise level is present, or a bounding polygon of such a portion. The spatial data can additionally or alternatively include values calculated from force data, e.g., the size or center of a bounding box of a portion in one or more dimensions, the location in one or more dimensions of the highest force in a portion, or the average magnitude or direction of force in a portion.

In some examples, the spatial data can include one or more vector representations of the detected spatially-varying forces or portions thereof. For example, the spatial data can include coordinates of contours of constant force magnitude, coordinates of outlines of areas experiencing a force above a threshold, or coordinates or axis values of centroids or bounding boxes of such areas, In some examples, the UI-presentation module 250 of the software application 208 can be configured to present for display a user interface. The user interface can be presented for display on a display 214 of user-interface hardware 212, or on another display. The user interface can have at least one content element or presentation element determined based at least in part on the identifier of the UTA 126, e.g., detected by the accessory-identifying module 236. In some examples, content elements can include, e.g., text box controls, labels, images, and other areas or representations conveying content not predetermined by the operating system 114 or the software application 208. In some examples, presentation elements can include, e.g., window borders, menus, shell controls, color schemes, sounds, and other areas or representations conveying structural or other information predetermined by the operating system 114 or the software application 208, or constant from the point of view of the software application 208. The user interface can include one or more screens or windows holding, e.g., content elements or presentation elements; different screens, windows, or elements can be visible at different times. For example, the user interface can show and hide different sets of screens, windows or elements at different times, e.g., in response to user inputs via the UIA 126. Further examples of user interfaces are discussed below.

Throughout this discussion, references to presenting user interfaces and representations "for display" are examples and not limiting. User interfaces and representations can alternatively or additionally be presented audibly, e.g., via speakers or headphones, or in a haptic or tactile manner, e.g., using force-feedback devices such as a SPACEBALL or using refreshable braille displays.

In some examples, the UI-presentation module 250 of the software application 208 can be configured to present for display the user interface including a plurality of content elements in an arrangement based at least in part on the detected identifier of the UIA 126. For example, the sequence, relative or absolute sizes, or relative or absolute positions of the content elements can be determined based at least in part on the identifier of the UIA 126. In some examples, the software application 208 can include a table, program module, or other data or instructions mapping the identifier of the UIA 126 to a list of relative positions of the content elements. The list of relative positions can include an indication of which user-interface screen or window should hold each content element. For example, the order or type of questions on a test or survey for a particular user can be determined using the list of relative positions corresponding to the identifier of that user's UIA 126.

In some examples, the representation-determining module 252 of the software application 208 can be configured to determine a representation of an object. The representation can be based at least in part on an identifier of the object, e.g., detected by the object-identifying module 242. For example, the representation can include a two-dimensional (2-D) or three-dimensional (3-D) model of the object determined, e.g., by querying a database of models using the identifier of the object. The database can be stored locally on the computing device 102 running the software application 208, or can be stored on a computing device 134.

In some examples, the object-presentation module 254 of the software application 208 can be configured to present for display the representation of the object. The presented representation can be arranged in the presented user interface based at least in part on spatial data of the object. The spatial data of the object can include at least location data of the object or shape data of the object. For example, the representation can be positioned based on the location data of the object. The representation can be rotated or flipped based on the shape data of the object. For example, in FIG. 3, the objects corresponding to outlines 308(1) and 308(3) are identical, but one is flipped along the long axis of the object compared to the other. Since the objects are not bilaterally symmetrical about the long axis, the shape data can be used to determine which side of the object is against the force sensor. The representation can then be oriented accordingly. In some examples, the representation can be presented with colors, shades, outlines, or other marks or attributes corresponding to the magnitude or direction of the force. For example, as the user presses object 310 more forcefully into the sensing surface 302, the representation can change color from green to yellow or red.

In some examples, the object-presentation module 254 can be configured to present the representation of the object in a three-dimensional virtual environment of the user interface. The three-dimensional virtual environment can be a subset of a four- or higher-dimensional virtual environment. In some examples, a geometry of the representation of the object in a first dimension or set of dimensions, e.g., an extent or a position of the representation of the object in the first dimension or set of dimensions, is determined based at least in part on the spatial data of the object. In some examples, a geometry (e.g., an extent or a position) of the representation of the object in a second dimension or set of dimensions is determined based at least in part on the identifier of the object. The first and second dimensions can be different, e.g., orthogonal or otherwise nonparallel, or the first set of dimensions can differ in at least one dimension from the second set of dimensions.

For example, in a virtual environment having a horizontal X-Y plane and a vertical Z axis orthogonal to the plane, the position of the representation of the first object in X, Y, or both can be determined based on the location of the object 310 with respect to the UIA 126. The height of the representation, e.g., the Z-axis extent of the representation, can be determined based on an identifier of the object. For example, the height can be retrieved from a datastore mapping identifiers to heights. This can permit modeling three-dimensional environments with the force sensor 124 providing data in only two dimensions.

In some examples, the object-presentation module 254 can be configured to determine that the spatial data of the object correspond to a spatial target. In the example of FIG. 3, the software application 208 can store data of the locations of the outlines 308 of the pentagons on the UIA 126. The spatial target can correspond to the location of outline 308(1), and the object can be object 310. The object-presentation module 254 can determine that the object 310 has been placed according to the outline 308(1). In response, the object-presentation module 254 can present for display a success indicator, e.g., a highlight, outline, star, or other indicator that the object 310 has been correctly positioned with respect to the UIA 126.

In some examples, the UI-presentation module 250 or the object-presentation module 254 can be configured to present for display a goal representation arranged in the user interface based at least in part on the spatial target. For example, an outline or shaded area shaped as the object 310 or the corresponding outline 308 can be displayed on screen. The goal representation can be positioned with respect to the representation of the object in a way corresponding to the spatial relationship between the object 310 and the corresponding outline 308. For example, when the object 310 is to the right of the outline 308(1), the representation of the object can be presented arranged to the right of the goal representation. The representations of the object or the goal can be presented with colors or other attributes determined based at least in part on, e.g., the distance between the object and the spatial target, or the degree of similarity or difference between an orientation of the object and an orientation of the spatial target. For example, if the object 310 is spaced apart from, or rotated or flipped with respect to, the spatial target, the goal representation can be highlighted more brightly than when the object 310 is close to or oriented as the spatial target.

Some examples present representations of multiple objects 310, 312. Functions described above with reference to spatial targets, goal representations, and success indicators can be performed for any number of objects. For example, a success indicator can be displayed when a plurality of objects have been positioned correctly with respect to respective spatial targets, whether or not goal indicator(s) were displayed for any particular one(s) of the objects.

In some examples involving multiple objects 310, 312, the representation-determining module 252 can be configured to determine that a second object, e.g., object 312, is in a selected spatial relationship with the object, e.g., object 310. The determination can be made based at least in part on the spatial data of the object and spatial data of the second object, e.g., on respective location data. The spatial data of the second object can include, e.g., location data of the second object or shape data of the second object. The selected spatial relationship can be represented, e.g., in data store 230, and can include, e.g., proximity of shapes, edges or vertices; proximity of defined connection points; similarity of orientation or of position along one axis; or coaxial positioning.

In some examples, e.g., in response to the determination that the object and the second object are in the selected spatial relationship, the representation-determining module 252 can determine a representation of the second object. The representation can be based at least in part on an identifier of the second object.

In some examples, e.g., in response to the determination that the object and the second object are in the selected spatial relationship, the object-presentation module 254 can present for display the representation of the second object. The representation of the second object can be arranged in the user interface, e.g., based at least in part on the spatial data of the object and the spatial data of the second object. In the example of FIG. 3, when objects 310 and 312 are placed and oriented according to the outlines 308(1) and 308(2), the respective representations of objects 310 and 312 can be presented together in the user interface, or with an indication that they are linked or correctly placed with respect to each other. Such an indication can include, e.g., a green or blue highlight indicating where the representations of objects 310 and 312 abut. Example functions described herein with respect to the object and the second object can be applied for any number of objects.

In some examples, the UI-presentation module 250 is responsive to the UIA 126 or type of UIA 126 detected, as graphically represented by the dashed arrow (the dashes are only for clarity). In some examples, individual UIAs 126 are associated with specific user interfaces. In some examples, individual types of UIAs 126 (e.g., USB device classes or other groupings of UIAs) are associated with specific user interfaces. For example, a UIA 126 having a 12-key piano keyboard can correspond to a first user interface of an application, and a UIA 126 have a 24-key piano keyboard can correspond to a second user interface of that application. In some examples, the application can, e.g., remove controls or UI features not relevant to the current UIA 126, improving operational efficiency, e.g., of users or other entities, by reducing screen clutter and by reducing the amount of time users have to search to locate a desired feature. Relationships between UIAs 126, types of UIAs 126, and user interfaces can be stored in any combination of memory in the UIA 126, memory in the computing device 102, or remote storage such as that hosted by the computing device 134.

In some examples, in response to detection by the accessory-identifying module 236 of a first user-input accessory, the UI-presentation module 250 can present for display a first user interface of an application. The first user interface can include at least one content element or presentation element determined based at least in part on a first identifier corresponding to the first user-input accessory. In response to detection by the accessory-identifying module 236 of a second, different user-input accessory, the UI-presentation module 250 can present for display a second, different user interface of the application. The second user interface can have at least one content element or presentation element determined based at least in part on a second identifier corresponding to the second user-input accessory. For example, the UI-presentation module 250 can retrieve a UI layout or a set of UI resources based at least in part on the identifer of the UTA 126, and arrange UI elements according to the retrieved layout or resources.

In some examples, the two user interfaces can include a basic interface and a "pro" interface. In some examples, the first user interface can include one or more user-interface controls. The second user interface can include the one or more user-interface controls from the first user interface, and one or more additional user-interface controls. For example, in a word-processing program, the first user interface can include a text-editing control and buttons for bold, italic, and underline. The second user interface can include the text-editing control and the buttons for bold, italic, and underline, and also buttons to invoke complex paragraph- and page-formatting dialogs.

In some examples, the two user interfaces can include a limited-functionality interface and a full-functionality (or not-as-limited functionality) interface. In some examples, the first user interface can include one or more user-interface controls presented in a disabled state. For example, the user-interface controls can be grayed out, nonresponsive to events or attempts to actuate them, or fixed in value. The second user interface can include the one or more user-interface controls presented in an enabled state. For example, in the second user interface, the controls can be presented in colors used for other active controls, can respond to events, or can be varying in value. For example, in a digital audio workstation (DAW) application, the first user interface can include a mixer with four volume sliders that are responsive to user inputs and four volume sliders that are locked at −∞ dB. The second user interface can include all eight volume sliders responsive to user inputs.

In some examples, the two user interfaces can present elements of the user interface in respective, different orders. In some examples, the first user interface can include one or more content elements presented in a first arrangement, e.g., a first order, sequence, or spatial layout. The second user interface can include the one or more content elements presented in a second, different arrangement. For example, the content elements can include survey questions or test questions, and the questions can be presented in different orders to users with different UIAs 126. This can provide randomization of the population of users answering the questions and reduce bias in the answers due to the ordering of the questions. In some examples, the order of elements can be stored in a database and the UI-presentation module 250 can query the database with the identifier of the UTA 126.

Illustrative Processes

Figure 5:
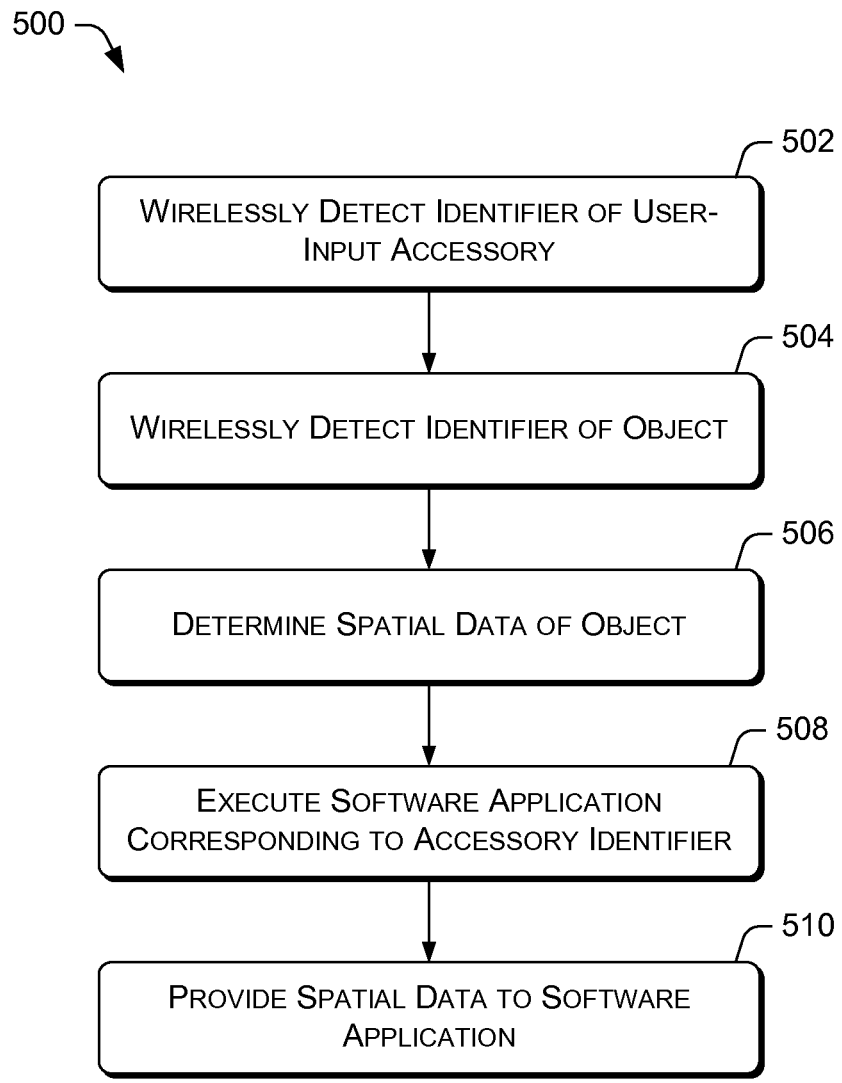
FIG. 5 is a flow diagram that illustrates example processes for application selection and operation.

FIG. 5 is a flow diagram that illustrates an example process 500 for selecting and operating an application using a computing device, e.g., computing device 200, FIG. 2. Example functions shown in FIG. 5 and other flow diagrams and example processes herein can be implemented on or otherwise embodied in one or more computing devices 102 or 134, e.g., using software running on such devices. In some examples, functions shown in FIG. 5 can be implemented in an operating system (OS), a hardware abstraction layer (HAL), or a device-management subsystem.

Figure 6:
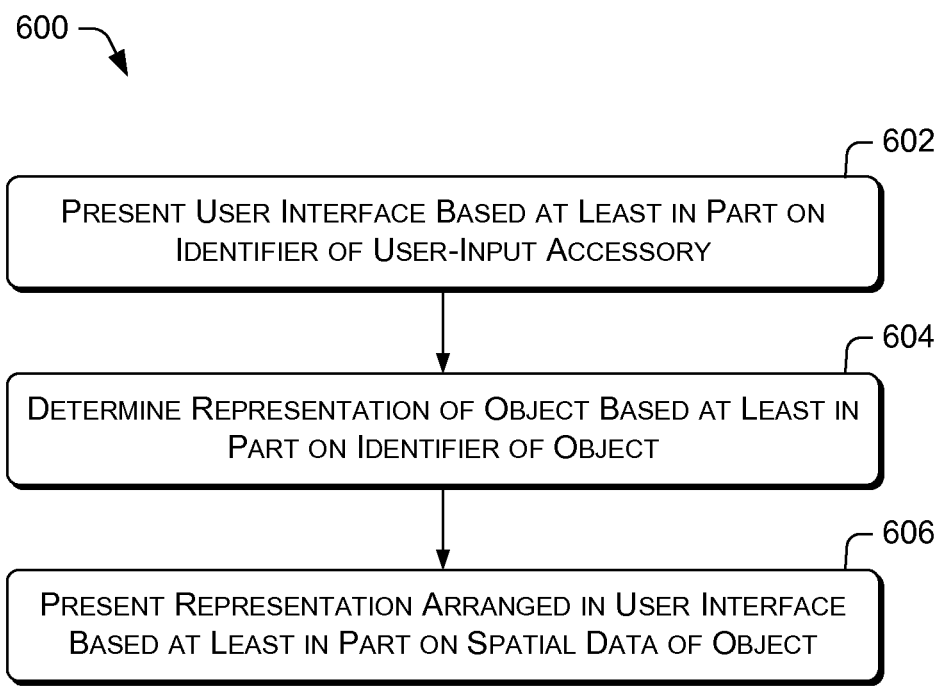
FIG. 6 is a flow diagram that illustrates example processes for application operation.
Figure 7:
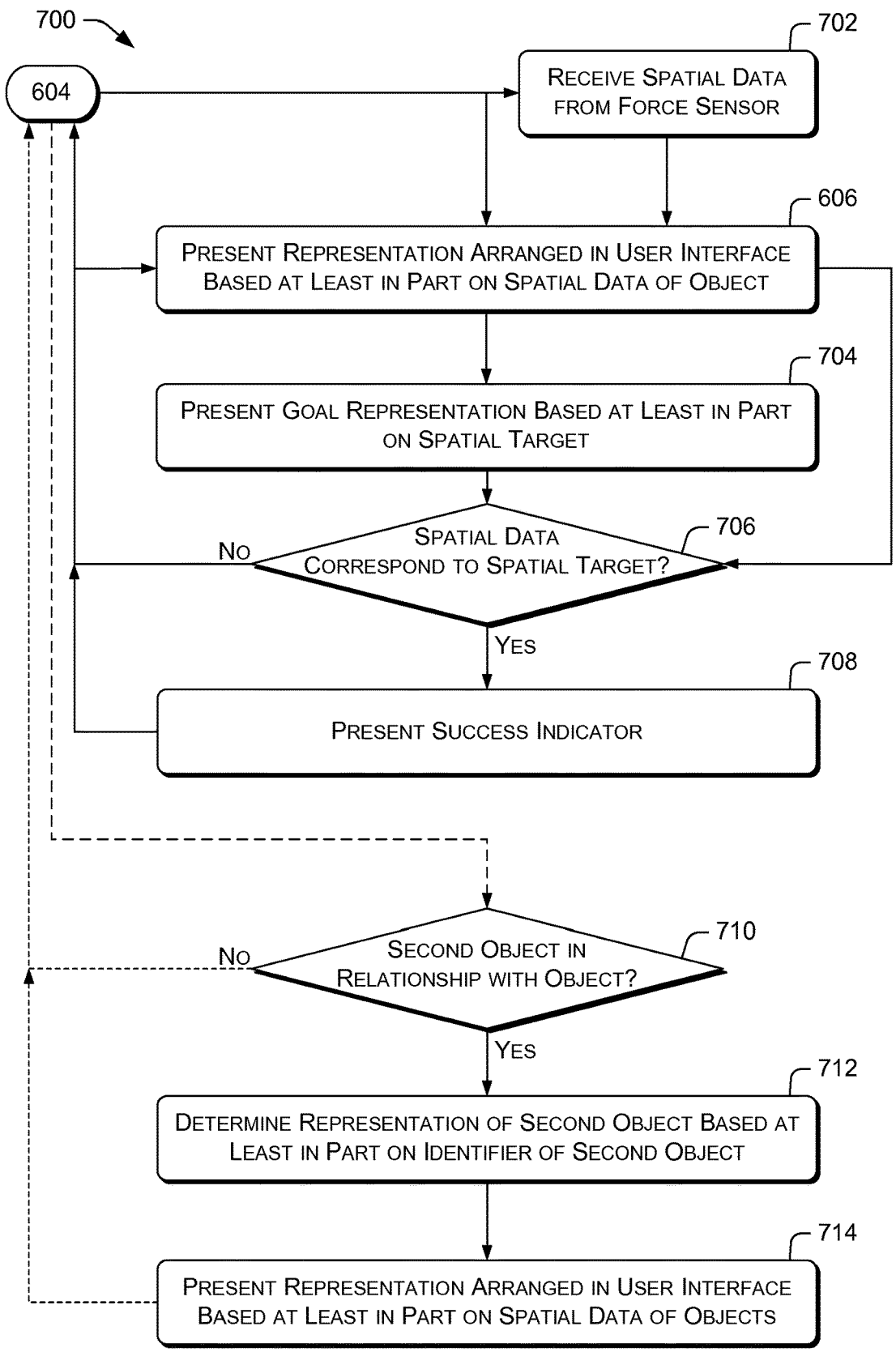
FIG. 7 is a flow diagram that illustrates example processes for application operation based on spatial data of one or more objects.
Figure 8:
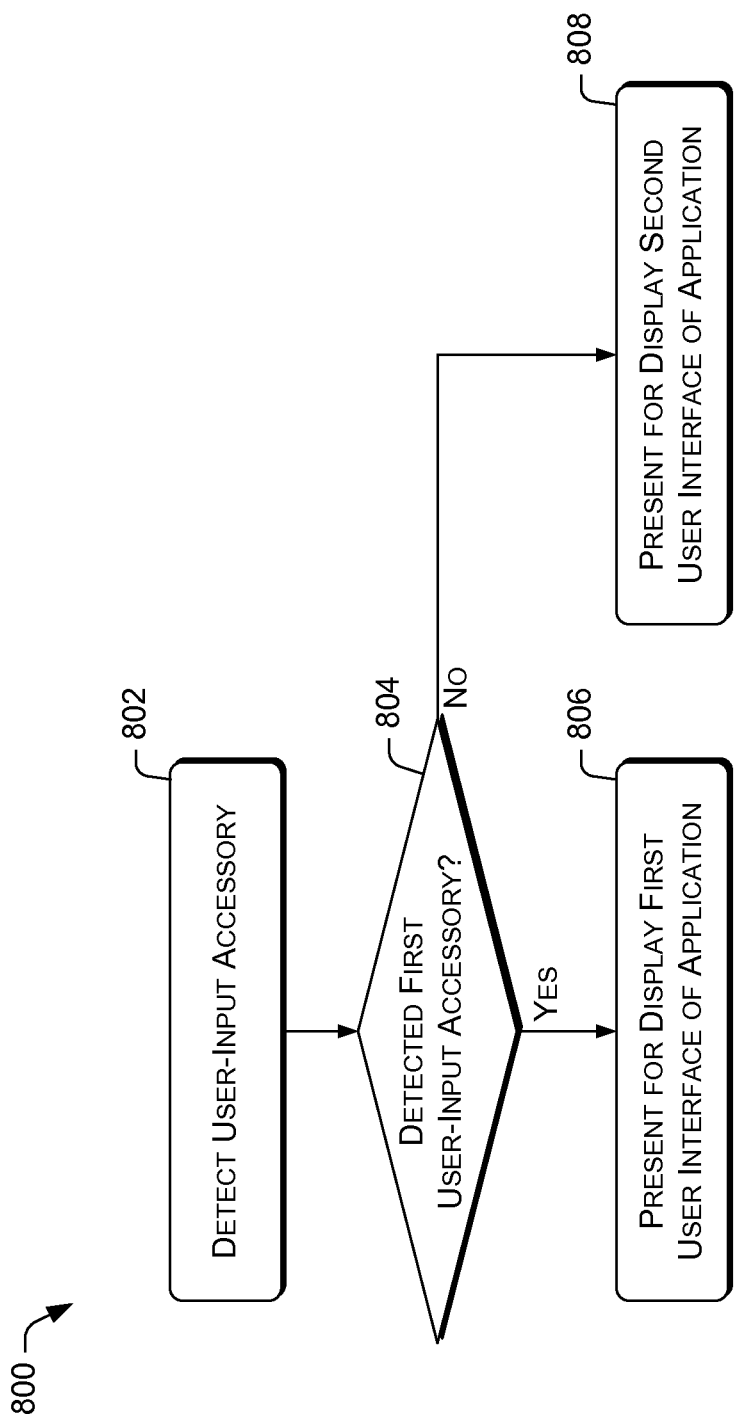
FIG. 8 is a flow diagram that illustrates example processes for user-interface selection based on a user-input accessory.

For the sake of illustration, the example process 500 is described below with reference to components of environment 100, FIG. 1, processing unit 224 and other components of computing device 200, FIG. 2, or computing device 300, FIG. 3, that can carry out or participate in the steps of the exemplary method. However, other processing units such as processing unit 108 and/or other components of computing devices 102 can carry out steps of described example processes such as process 500. Similarly, exemplary methods shown in FIGS. 6, 7, and 8 are also not limited to being carried out by any particularly-identified components.

The order in which the operations are described in each example flow diagram or process is not intended to be construed as a limitation, and any number of the described operations can be combined in any order and/or in parallel to implement each process. In some nonlimiting examples, either of blocks 506 and 508 can be performed before the other, or block 508 can be performed before block 504. Moreover, the operations in each of FIGS. 5, 6, 7, and 8 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

At block 502, in some examples, the accessory-identifying module 236 can wirelessly detect a first identifier corresponding to a user-input accessory, e.g., by reading an RFID tag on the UTA 126. This can be done, e.g., as described above with reference to the wireless interrogator 122, FIG. 1, or the accessory-identifying module 236, FIG. 4.

At block 504, in some examples, the object-identifying module 242 can wirelessly detect a second identifier corresponding to an object, e.g., by reading an RFID tag on the object. This can be done, e.g., as described above with reference to the wireless interrogator 122, FIG. 1, or the object-identifying module 242, FIG. 4.

At block 506, the force-analysis module 246 can determine spatial data of the object using the force sensor 124. The spatial data can include at least location data of the object or shape data of the object. This can be done, e.g., as discussed above with reference to the force sensor 124 or the force-analysis module 246, FIG. 4.

At block 508, the spawning module 240 can execute a software application corresponding to the first identifier, e.g., by calling CreateProcess( ) on a Windows system or fork( ) and exec on a UNIX system. This can be done, e.g., as discussed above with reference to the spawning module 240, FIG. 4. As noted above, in some examples, if the software application corresponding to the first identifier is not available, block 508 can include executing an installation package of the software application or executing a user interface configured to permit the user to locate, download, or purchase the software application. Block 508 can then include executing the software application when the installation, download, or purchase is complete.

At block 510, the force-analysis module 246 can provide the spatial data to the software application. This can be done, e.g., using IPC or other techniques discussed above with reference to the force-analysis module 246, FIG. 4.

FIG. 6 is a flow diagram that illustrates an example process 600 for operation of an application, e.g., by presenting a representation of a physical object using a computing device, e.g., computing device 200, FIG. 2.

At block 602, the UI-presentation module 250 can present for display a user interface. The user interface can have at least one content element or presentation element determined based at least in part on an identifier of a UTA 126. This can be done, e.g., as described above with reference to the UI-presentation module 250, FIG. 4.

In some examples, block 602 can include presenting a plurality of content elements in an arrangement based at least in part on the identifier of the user-input accessory. This can be done, e.g., as described above with reference to the UI-presentation module 250, FIG. 4.

At block 604, the representation-determining module 252 can determine a representation of an object. The representation can be determined based at least in part on an identifier of the object. This can be done, e.g., as described above with reference to the representation-determining module 252, FIG. 4.

At block 606, the object-presentation module 254 can present for display the representation of the object. The representation can be presented arranged in the user interface based at least in part on spatial data of the object. The spatial data of the object can include at least location data of the object or shape data of the object. This can be done, e.g., as described above with reference to the object-presentation module 254, FIG. 4.

In some examples, block 606 can include presenting the representation of the object in a three-dimensional virtual environment of the user interface. An extent or a position of the representation of the object in a first dimension can be determined based at least in part on the spatial data of the object. An extent or a position of the representation of the object in a second, different dimension can be determined based at least in part on the identifier of the object. For example, the location of the representation can be determined based on the spatial data, and the height of the representation can be retrieved from a database queried by the identifier of the object. This can be done, e.g., as described above with reference to the object-presentation module 254, FIG. 4.

FIG. 7 is a flow diagram that illustrates an example process 700 for operating an application based on spatial data of one or more objects, e.g., by presenting a representation of a physical object using a computing device, e.g., computing device 200, FIG. 2. Block 602 can also be used with process 700 but is omitted from FIG. 7 for brevity. Block 604 can be followed by block 606, block 702, or block 710. The dash styles of lines in FIG. 7 are solely for clarity.

At block 702, the force-detecting module 244 or the force-analysis module 246 can receive the spatial data of the object from a force sensor having a plurality of sensing elements distributed across a sensing surface. This can be done, e.g., as described above with reference to the force-detecting module 244 or the force-analysis module 246, FIG. 4. Block 702 can be followed by block 606, which can be followed by block 704 or block 706.

At block 704, the UI-presentation module 250 or the object-presentation module 254 can present for display a goal representation arranged in the user interface based at least in part on a spatial target. This can be done, e.g., as described above with reference to the outlines 308, FIG. 3, or the UI-presentation module 250 or the object-presentation module 254, FIG. 4. The goal representation can be used for, e.g., educational software applications 208 such as shape-sorting applications.

At block 706, the UI-presentation module 250 or the object-presentation module 254 can determine whether the spatial data of the object correspond to a spatial target. If so, the next block can be block 708. This determination can be made whether or not a goal representation was displayed (block 704). For example, a goal representation can be displayed for a shape-sorting application and omitted for a tangram application. This can be done, e.g., as described above with reference to the outlines 308, FIG. 3, or the UI-presentation module 250 or the object-presentation module 254, FIG. 4.

At block 708, in response to a positive determination at block 706, the UI-presentation module 250 or the object-presentation module 254 can present for display a success indicator. This can be done, e.g., as described above with reference to the object-presentation module 254, FIG. 4.

At block 710, the UI-presentation module 250 or the representation-determining module 252 can determine whether a second object is in a selected spatial relationship with the object based at least in part on the spatial data of the object and spatial data of the second object. If so, the next block can be block 712. This can be done, e.g., as described above with reference to the representation-determining module 252, FIG. 4.

At block 712, the representation-determining module 252 can determine a representation of the second object, the representation based at least in part on an identifier of the second object. This can be done, e.g., as described above with reference to the representation-determining module 252, FIG. 4.

At block 714, the object-presentation module 254 can present for display the representation of the second object arranged in the user interface based at least in part on the spatial data of the object and the spatial data of the second object. The spatial data of the second object can include at least location data of the second object or shape data of the second object. This can be done, e.g., as described above with reference to the object-presentation module 254, FIG. 4.

FIG. 8 is a flow diagram that illustrates an example process 800 for selecting a user interface for an application using a computing device, e.g., computing device 200, FIG. 2. In some example, the user interface can be selected based upon a user-input accessory. This can provide the user an efficient experience with the particular UIA 126 that user has selected.

At block 802, the accessory-identifying module 236 can detect a UIA 126. This can be done, e.g., by wirelessly detecting an identifier of the UIA 126, e.g., as discussed above with reference to the wireless interrogator 122, FIG. 1.

At block 804, the accessory-identifying module 236, the app-determining module 238, or the UI-presentation module 250 can determine whether the detected UIA 126 is a first UIA or a second, different UIA, e.g., as discussed above with reference to FIG. 4. Block 804 can also distinguish between more than two UIAs or types of UIAs. Block 804 can be followed by, e.g., block 806 or block 808 (or other blocks omitted for brevity) depending on the type of the UIA 126.

At block 806, in response to detection of the first UIA (blocks 802, 804), the UI-presentation module 250 can present for display a first user interface of an application. The first user interface can have at least one content element or presentation element determined based at least in part on a first identifier corresponding to the first user-input accessory.

At block 808, in response to detection of the second UIA (blocks 802, 804), the UI-presentation module 250 can present for display a second user interface of the application. The second user interface can have at least one content element or presentation element determined based at least in part on a second identifier corresponding to the second user-input accessory. The second user interface can be different from the first user interface. For example, the second user interface can have at least one content element or presentation element the first user interface lacks, or vice versa.

In some examples, the first user interface can include one or more user-interface controls and the second user interface can include the one or more user-interface controls and one or more additional user-interface controls. This can be done, e.g., as described above with reference to the UI-presentation module 250, FIG. 4.

In some examples, the first user interface can include one or more user-interface controls presented in a disabled state and the second user interface can include the one or more user-interface controls presented in an enabled state. This can be done, e.g., as described above with reference to the UI-presentation module 250, FIG. 4.

In some examples, first user interface can include one or more content elements presented in a first arrangement and the second user interface can include the one or more content elements presented in a second, different arrangement. This can be done, e.g., as described above with reference to the UI-presentation module 250, FIG. 4.

Example Clauses

A: A device comprising: a wireless interrogator configured to: wirelessly detect a first identifier associated with a tagged user-input accessory in operational proximity to the wireless interrogator; and wirelessly detect a second identifier associated with a tagged object in operational proximity to the wireless interrogator; a force sensor having a sensing surface; one or more computer-readable media having stored thereon a plurality of modules; and one or more processing units operably coupled to the wireless interrogator, the force sensor, and at least one of the computer-readable media, the processing unit adapted to execute modules of the plurality of modules comprising: a launching engine configured to: determine a software application corresponding to the first identifier; and execute the determined software application; and an interaction engine configured to: detect a force exerted against the sensing surface by the object; and provide to the software application information of the second identifier and information of the detected force.

B: A device as recited in paragraph A, wherein the force sensor is configured to detect spatially-varying forces across the sensing surface.

C: A device as recited in paragraph B, wherein the interaction engine is further configured to: determine a location of the object based at least in part on the detected spatially-varying forces; and provide, to the software application, information of the determined location.

D: A device as recited in paragraph B or C, wherein the interaction engine is further configured to: determine a shape of the object based at least in part on the detected spatially-varying forces; and provide, to the software application, information of the determined shape.

E: A device as recited in any of paragraphs B-D, wherein the force sensor comprises a plurality of sensing elements distributed across the sensing surface.

F: A device as recited in any of paragraphs A-E, wherein the one or more computer-readable media have stored thereon one or more mappings of identifiers to respective software applications and the launching engine is further configured to determine the software application corresponding to the first identifier using the one or more mappings.

G: A device as recited in any of paragraphs A-F, further comprising a communications interface, wherein the launching engine is further configured to determine the software application corresponding to the first identifier by transmitting the first identifier via the communications interface and receiving an indication of the software application via the communications interface.

H: A device as recited in any of paragraphs A-G, wherein the wireless interrogator comprises a radio-frequency identification (RFID) reader configured to wirelessly detect the identifiers of RFID-tagged ones of the tagged objects.

I: A device as recited in any of paragraphs A-H, further comprising a mounting feature configured to retain the user-input accessory in operational relationship with the sensing surface.

J: A device as recited in any of paragraphs A-I, wherein the user-input accessory comprises a pad configured to overlie the force sensor.

K: A device as recited in any of paragraphs A-J, wherein the one or more computer-readable media have stored thereon one or more mappings of identifiers to respective software applications and the launching engine is further configured to determine the software application corresponding to the first identifier using the one or more mappings, the determining including selecting, from the one or more mappings, a candidate mapping corresponding to the first identifier; and verifying a cryptographic signature of the candidate mapping.

L: A device as recited in any of paragraphs A-K, wherein the launching engine is configured to, if the determined software application is not available to be executed, execute an installation package of the determined software application.

M: A device as recited in any of paragraphs A-L, wherein the launching engine is configured to, if the determined software application is not available to be executed, execute a user interface configured to permit the user to locate, download, or purchase the determined software application.

N: A device as recited in paragraph M, wherein the user interface is configured to, when executed, present an indication of the determined software application; receive payment information; and, at least partly in response to the received payment information, download the determined software application.

O: A device as recited in any of paragraphs A-N, wherein the user-input accessory includes a pad configured to overlie the sensing surface.

P: A computer-implemented method comprising: presenting for display a user interface having at least one content element or presentation element determined based at least in part on an identifier of a user-input accessory; determining a representation of an object, the representation based at least in part on an identifier of the object; and presenting for display the representation of the object arranged in the user interface based at least in part on spatial data of the object, wherein the spatial data of the object comprises at least location data of the object or shape data of the object.

Q: A computer-implemented method as recited in paragraph P, further comprising: determining that the spatial data of the object correspond to a spatial target; and in response, presenting for display a success indicator.

R: A computer-implemented method as recited in paragraph Q, further comprising presenting for display a goal representation arranged in the user interface based at least in part on the spatial target.

S: A computer-implemented method as recited in any of paragraphs P-R, wherein: the presenting the representation of the object comprises presenting the representation of the object in a three-dimensional virtual environment of the user interface; a geometry of the representation of the object in a first dimension is determined based at least in part on the spatial data of the object; and a geometry of the representation of the object in a second, different dimension is determined based at least in part on the identifier of the object.

T: A computer-implemented method as recited in any of paragraphs P-S, further comprising: determining that a second object is in a selected spatial relationship with the object based at least in part on the spatial data of the object and spatial data of the second object; determining a representation of the second object, the representation based at least in part on an identifier of the second object; and presenting for display the representation of the second object arranged in the user interface based at least in part on the spatial data of the object and the spatial data of the second object, wherein the spatial data of the second object comprises at least location data of the second object or shape data of the second object.

U: A computer-implemented method as recited in any of paragraphs P-T, wherein the presenting the user interface comprises presenting a plurality of content elements in an arrangement based at least in part on the identifier of the user-input accessory.

V: A computer-implemented method as recited in any of paragraphs P-U, further comprising receiving the spatial data of the object from a force sensor having a plurality of sensing elements distributed across a sensing surface.

W: A computer-readable medium, e.g., a computer storage medium, having thereon computer-executable instructions, the computer-executable instructions upon execution configuring a computer to perform operations as recited in any of paragraphs P-V.

X: A device comprising: a processor; and a computer-readable medium, e.g., a computer storage medium, having thereon computer-executable instructions, the computer-executable instructions upon execution by the processor configuring the device to perform operations as recited in any of paragraphs P-V.

Y: A system comprising: means for processing; and means for storing having thereon computer-executable instructions, the computer-executable instructions including means to configure the system to carry out a method as recited in any of paragraphs P-V.

Z: A computer-readable medium having thereon computer-executable instructions, the computer-executable instructions upon execution configuring a computer to perform operations comprising: detecting a first user-input accessory and, in response, presenting for display a first user interface of an application, the first user interface having at least one content element or presentation element determined based at least in part on a first identifier corresponding to the first user-input accessory; and detecting a second, different user-input accessory and, in response, presenting for display a second, different user interface of the application, the second user interface having at least one content element or presentation element determined based at least in part on a second identifier corresponding to the second user-input accessory.

AA: A computer-readable medium as recited in paragraph Z, wherein the first user interface includes one or more user-interface controls and the second user interface includes the one or more user-interface controls and one or more additional user-interface controls.

AB: A computer-readable medium as recited in paragraph Z or AA, wherein the first user interface includes one or more user-interface controls presented in a disabled state and the second user interface includes the one or more user-interface controls presented in an enabled state.

AC: A computer-readable medium as recited in any of paragraphs Z-AB, wherein the first user interface includes one or more content elements presented in a first arrangement and the second user interface includes the one or more content elements presented in a second, different arrangement.

AD: A device comprising: a processor; and a computer-readable medium as recited in any of paragraphs Z-AC.

AE: A system comprising: means for processing; and a computer-readable medium as recited in any of paragraphs Z-AC, the computer-readable medium storing instructions executable by the means for processing.

AF: A device comprising: one or more computer-readable media having stored thereon a plurality of modules; and one or more processing units operably coupled to at least one of the computer-readable media, the processing unit adapted to execute modules of the plurality of modules comprising: a launching engine configured to: detect a first identifier corresponding to a user-input accessory; determine a software application corresponding to the first identifier; and execute the determined software application; and an interaction engine configured to: detect a second identifier corresponding to an object; detect a force exerted by the object; and provide to the software application information of the second identifier and information of the detected force.

AG: A device as recited in paragraph AF, wherein the one or more computer-readable media have stored thereon one or more mappings of identifiers to respective software applications and the launching engine is further configured to determine the software application corresponding to the first identifier using the one or more mappings, the determining including selecting, from the one or more mappings, a candidate mapping corresponding to the first identifier; and verifying a cryptographic signature of the candidate mapping.

AH: A device as recited in paragraph AF or AG, wherein the launching engine is configured to, if the determined software application is not available to be executed, execute an installation package of the determined software application.

AI: A device as recited in any of paragraphs AF-AH, wherein the launching engine is configured to, if the determined software application is not available to be executed, execute a user interface configured to permit the user to locate, download, or purchase the determined software application.

AJ: A device as recited in paragraph AI, wherein the user interface is configured to, when executed, present an indication of the determined software application; receive payment information; and, at least partly in response to the received payment information, download the determined software application.

AK: A device as recited in any of paragraphs AF-AJ, further comprising a sensing surface, wherein the interaction engine is configured to detect spatially-varying forces exerted by the object across the sensing surface.

AL: A device as recited in paragraph AK, wherein the interaction engine is further configured to: determine a location of the object based at least in part on the detected spatially-varying forces; and provide, to the software application (e.g., the determined software application), information of the determined location.

AM: A device as recited in paragraph AK or AL, wherein the interaction engine is further configured to: determine a shape of the object based at least in part on the detected spatially-varying forces; and provide, to the software application, information of the determined shape.

AN: A device as recited in any of paragraphs AK-AM, further comprising a plurality of sensing elements distributed across the sensing surface.

AO: A device as recited in any of paragraphs AK-AN, wherein the user-input accessory includes a pad configured to overlie the sensing surface.

AP: A device as recited in any of paragraphs AF-AO, wherein the one or more computer-readable media have stored thereon one or more mappings of identifiers to respective software applications and the launching engine is further configured to determine the software application corresponding to the first identifier using the one or more mappings.

AQ: A device as recited in any of paragraphs AF-AP, further comprising a communications interface, wherein the launching engine is further configured to determine the software application corresponding to the first identifier by transmitting the first identifier via the communications interface and receiving an indication of the software application via the communications interface.

AR: A device as recited in any of paragraphs AF-AQ, further comprising a radio-frequency identification (RFID) reader configured to wirelessly detect the identifiers of RFID-tagged ones of the tagged objects.

AS: A device as recited in any of paragraphs AF-AR, further comprising a mounting feature configured to retain the user-input accessory in operational relationship with the sensing surface.

AT: A computer-implemented method comprising: wirelessly detecting a first identifier corresponding to a user-input accessory; wirelessly detecting a second identifier corresponding to an object; determining spatial data of the object using a force sensor, wherein the spatial data comprises at least location data of the object or shape data of the object; executing a software application corresponding to the first identifier; and providing the spatial data to the software application.

AU: A computer-implemented method as recited in paragraph AT, wherein the determining spatial data comprises detecting spatially-varying forces across the sensing surface using the force sensor.

AV: A computer-implemented method as recited in paragraph AU, wherein the determining spatial data comprises determining the location data of the object based at least in part on the detected spatially-varying forces.

AW: A computer-implemented method as recited in paragraph AU or AV, wherein the determining spatial data comprises determining the shape data of the object based at least in part on the detected spatially-varying forces.

AX: A computer-implemented method as recited in any of paragraphs AT-AW, wherein the executing the software application comprises determining the software application corresponding to the first identifier using one or more stored mappings of identifiers to respective software applications.

AY: A computer-implemented method as recited in any of paragraphs AT-AX, wherein the executing the software application comprises transmitting the first identifier via a communications interface and receiving an indication of the software application via the communications interface.

AZ: A computer-implemented method as recited in any of paragraphs AT-AY, wherein the wirelessly detecting the first identifier comprises retrieving the first identifier from a radio-frequency identification (RFID) tag of the user-input accessory.

BA: A computer-implemented method as recited in any of paragraphs AT-AZ, wherein the wirelessly detecting the second identifier comprises retrieving the second identifier from an RFID tag of the object.

BB: A computer-implemented method as recited in any of paragraphs AT-BA, wherein the executing the software application comprises selecting, from one or more stored mappings of identifiers to respective software applications, a candidate mapping corresponding to the first identifier; verifying a cryptographic signature of the candidate mapping; and, in response to the verifying, executing the software application indicated in the candidate mapping.

BC: A computer-implemented method as recited in any of paragraphs AT-BB, wherein the executing the software application comprises executing an installation package of the software application in response to the software application being unavailable to be executed.

BD: A computer-implemented method as recited in any of paragraphs AT-BC, wherein the executing the software application comprises, if the software application is not available to be executed, executing a user interface configured to permit the user to locate, download, or purchase the determined software application.

BE: A computer-implemented method as recited in paragraph BD, wherein the executing the user interface includes presenting an indication of the determined software application; receiving payment information; and, at least partly in response to the received payment information, downloading the determined software application.

BF: A computer-readable medium, e.g., a computer storage medium, having thereon computer-executable instructions, the computer-executable instructions upon execution configuring a computer to perform operations as recited in any of paragraphs AT-BE.

BG: A device comprising: a processor; and a computer-readable medium, e.g., a computer storage medium, having thereon computer-executable instructions, the computer-executable instructions upon execution by the processor configuring the device to perform operations as recited in any of paragraphs AT-BE.

BH: A system comprising: means for processing; and means for storing having thereon computer-executable instructions, the computer-executable instructions including means to configure the system to carry out a method as recited in any of paragraphs AT-BE.

Conclusion

Application selection and operation techniques described herein can reduce the amount of time required to locate and execute a software application corresponding to a user-input accessory. This can provide increases in operational efficiency, e.g., in user efficiency and satisfaction. Application operation techniques described herein can provide rapid feedback or evaluation regarding the placement of objects on a force sensor. This can reduce the effort required for users or other entities to manipulate visual objects, increasing operational efficiency in such manipulations.

Although the techniques have been described in language particular to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing devices 102, 134, 200, or 300 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrases "X, Y or Z" and "at least one of X, Y or Z," unless specifically stated otherwise, is to be understood to present that an item, term, etc. can be either X, Y, or Z, or a combination thereof.

The disclosure includes combinations of the examples described herein. References to a particular "example" and the like refer to features that are present in at least one example or configuration of what is within the scope of the disclosed subject matter. Separate references to "an example" or "particular examples" or the like do not necessarily refer to the same example or examples; however, such examples are not mutually exclusive, unless specifically indicated. The use of singular or plural in referring to "example," "examples," "method," "methods" and the like is not limiting.

Any routine descriptions, elements or blocks in the flow diagrams described herein and/or depicted in the attached figures should be understood as potentially representing modules, segments, or portions of code that include one or more executable instructions for implementing particular logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A device, comprising:
a wireless interrogator configured to:
wirelessly detect a first identifier associated with a tagged user-input accessory in operational proximity to the wireless interrogator;
wirelessly detect a second identifier associated with a tagged object in operational proximity to the wireless interrogator, wherein the tagged object is separate from the tagged user-input accessory; and
wirelessly detect a third identifier associated with a second tagged object in operational proximity to the wireless interrogator, wherein the second tagged object is separate from the tagged object and the tagged user-input accessory;
one or more computer-readable media having stored thereon a plurality of modules; and
one or more processing units operably coupled to the wireless interrogator, a force sensor having a sensing surface, and at least one of the one or more computer-readable media, the one or more processing units adapted to execute modules of the plurality of modules comprising:
a launching engine configured to:
determine a software application corresponding to the first identifier; and
execute the software application;
an interaction engine configured to:
detect a first force exerted against the sensing surface of the force sensor by the tagged user-input accessory located on the sensing surface;
detect a second force exerted against the sensing surface of the force sensor by the tagged object located on top of the tagged user-input accessory, wherein the second force is applied concurrently with the first force;
detect a third force exerted against the sensing surface of the force sensor by the second tagged object located on top of the tagged user-input accessory, wherein the third force is applied concurrently with the first force and the second force;
provide information of the second identifier and information of the detected second force to the software application corresponding to the first identifier during execution of the software application; and
provide information of the third identifier and information of the detected third force to the software application corresponding to the first identifier during execution of the software application; and
a user interface presentation module of the software application configured to:
present for display a representation of the tagged object based at least in part on the information of the second identifier, the information of the detected second force, and the execution of the software application corresponding to the first identifier associated with the tagged user-input accessory; and
present for display a subsequent representation of an interaction between the tagged object and the second tagged object based at least in part on the information of the second identifier, the information of the detected second force, the information of the third identifier, and the information of the detected third force.

2. The device as recited in claim 1, wherein the force sensor is configured to detect spatially-varying forces across the sensing surface.

3. The device as recited in claim 2, wherein the interaction engine is further configured to:
determine a location of the tagged object based at least in part on the detected spatially-varying forces; and
provide, to the software application, information of the determined location.

4. The device as recited in claim 2, wherein the interaction engine is further configured to:
determine a shape of the tagged object based at least in part on the detected spatially-varying forces; and
provide, to the software application, information of the determined shape.

5. The device as recited in claim 2, wherein the force sensor comprises a plurality of sensing elements distributed across the sensing surface.

6. The device as recited in claim 1, wherein the one or more computer-readable media have stored thereon one or more mappings of identifiers to respective software applications and the launching engine is further configured to determine the software application corresponding to the first identifier using the one or more mappings.

7. The device as recited in claim 1, further comprising a communications interface, wherein the launching engine is further configured to determine the software application corresponding to the first identifier by transmitting the first identifier via the communications interface and receiving an indication of the software application via the communications interface.

8. The device as recited in claim 1, wherein the tagged object comprises an RFID tagged object, and wherein the wireless interrogator comprises a radio-frequency identification (RFID) reader configured to wirelessly detect the second identifier of the RFID tagged object.

9. The device as recited in claim 1, further comprising a mounting feature configured to retain the tagged user-input accessory in operational relationship with the sensing surface.

10. A method of operating one or more software applications on a computing device, comprising:
wirelessly detecting a first identifier associated with a tagged user-input accessory in operational proximity to a wireless interrogator of the computing device;
wirelessly detecting a second identifier associated with a tagged object in operational proximity to the wireless interrogator, wherein the tagged object is separate from the tagged user-input accessory;
wirelessly detecting a third identifier associated with a second tagged object in operational proximity to the wireless interrogator, wherein the second tagged object is separate from the tagged object and the tagged user-input accessory;
determining a software application corresponding to the first identifier;
executing the determined software application;
detecting a first force exerted against a sensing surface of a force sensor by the tagged user-input accessory located on the sensing surface;
detecting a second force exerted against the sensing surface of the force sensor by the tagged object located on top of the tagged user-input accessory, wherein the second force is applied concurrently with the first force;

detecting a third force exerted against the sensing surface of the force sensor by the second tagged object located on top of the tagged user-input accessory, wherein the third force is applied concurrently with the first force and the second force;

providing information of the second identifier and information of the detected second force to the software application corresponding to the first identifier during execution of the software application;

providing information of the third identifier and information of the detected third force to the software application corresponding to the first identifier during execution of the software application;

presenting, via the tagged user-input accessory, a first representation corresponding to the tagged object based on at least one of the information of the second identifier, the information of the detected second force, or an arrangement of the tagged object;

presenting, via a display of the computing device, by the software application a second representation of the tagged object based at least in part on the information of the second identifier, the information of the detected second force, and the execution of the software application corresponding to the first identifier associated with the tagged user-input accessory; and presenting, via the display of the computing device, by the software application a subsequent representation of an interaction between the tagged object and the second tagged object based at least in part on the information of the second identifier, the information of the detected second force, the information of the third identifier, and the information of the detected third force.

* * * * *